US012484803B2

(12) United States Patent
Nielsen et al.

(10) Patent No.: US 12,484,803 B2
(45) Date of Patent: Dec. 2, 2025

(54) IMAGE PROCESSING APPARATUS, IMAGE PROCESSING METHOD, AND MAGNETIC RESONANCE IMAGING APPARATUS

(71) Applicant: CANON MEDICAL SYSTEMS CORPORATION, Tochigi (JP)

(72) Inventors: Matthew Nielsen, Yokohama (JP); Mitsuhiro Bekku, Utsunomiya (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 171 days.

(21) Appl. No.: 18/460,740

(22) Filed: Sep. 5, 2023

(65) Prior Publication Data
US 2024/0074671 A1    Mar. 7, 2024

(30) Foreign Application Priority Data

Sep. 5, 2022    (JP) ................................. 2022-140932

(51) Int. Cl.
*A61B 5/055*    (2006.01)
*G06T 5/50*    (2006.01)
*G06T 7/00*    (2017.01)

(52) U.S. Cl.
CPC ............... *A61B 5/055* (2013.01); *G06T 5/50* (2013.01); *G06T 7/0012* (2013.01); *G06T 2207/20224* (2013.01); *G06T 2207/30016* (2013.01)

(58) Field of Classification Search
CPC ........ A61B 2017/00725; G06T 7/0012; G06T 5/50
See application file for complete search history.

(56) References Cited

U.S. PATENT DOCUMENTS 5,390,258 A * 2/1995 Levin .................. G01R 33/561
382/131
8,948,534 B2    2/2015 Zha et al.
(Continued)

FOREIGN PATENT DOCUMENTS

JP    2012-228507 A    11/2012
JP    2016-509940 A    4/2016
(Continued)

OTHER PUBLICATIONS

Kellner et al., "Gibbs-Ringing Artifact Removal Based on Local Subvoxel-Shifts" Magnetic Resonance in Medicine, 2016, pp. 1574-1581.
(Continued)

*Primary Examiner* — Huy Q Phan
*Assistant Examiner* — Temilade S Rhodes-Vivour
(74) *Attorney, Agent, or Firm* — Oblon, McClelland, Maier & Neustadt, L.L.P.

(57) ABSTRACT

An image processing apparatus according to an embodiment includes processing circuitry. The processing circuitry determines, with respect to each of the pixels included in a magnetic resonance image, a shift amount from the position of the pixel to a position where ringing artifacts will be reduced and performs a ringing correction to correct the ringing artifacts occurring in the magnetic resonance image on the basis of the determined shift amounts. The processing circuitry estimates, with respect to each of the pixels, a local amplitude of ringing artifacts, and performs the ringing correction on the magnetic resonance image while determining the shift amount of each of the pixels so as to be approximately continuous with the shift amounts of adjacently positioned pixels, sequentially in descending order starting with pixels having a higher local amplitude on the basis of the estimated local amplitudes of ringing artifacts.

10 Claims, 21 Drawing Sheets

(56) References Cited

U.S. PATENT DOCUMENTS

| | | |
|---|---|---|
| 10,107,884 B2 | 10/2018 | Boernert et al. |
| 11,300,646 B2 | 4/2022 | Isogawa et al. |
| 2004/0071363 A1* | 4/2004 | Kouri .................. G06T 5/10 |
| | | 382/128 |
| 2012/0269414 A1 | 10/2012 | Zha et al. |
| 2014/0163664 A1* | 6/2014 | Goldsmith ......... A61B 17/0057 |
| | | 604/93.01 |
| 2016/0018498 A1 | 1/2016 | Boernert et al. |
| 2016/0131730 A1* | 5/2016 | Isogawa ............... G01R 33/565 |
| | | 324/309 |
| 2017/0154419 A1* | 6/2017 | Shiroishi ................ G01R 33/50 |
| 2017/0199261 A1 | 7/2017 | Farr et al. |
| 2022/0187402 A1 | 6/2022 | Isogawa et al. |

FOREIGN PATENT DOCUMENTS

| | | |
|---|---|---|
| JP | 2016-93494 A | 5/2016 |
| JP | 2020-49237 A | 4/2020 |
| JP | 2020-120704 A | 8/2020 |

OTHER PUBLICATIONS

Penkin et al., "Hybrid Method for Gibbs-Ringing Artifact Suppression in Magnetic Resonance Images" ISSN 0361-7688, Programming and Computer Software, vol. 47, No. 3, 2021, pp. 207-214.

\* cited by examiner

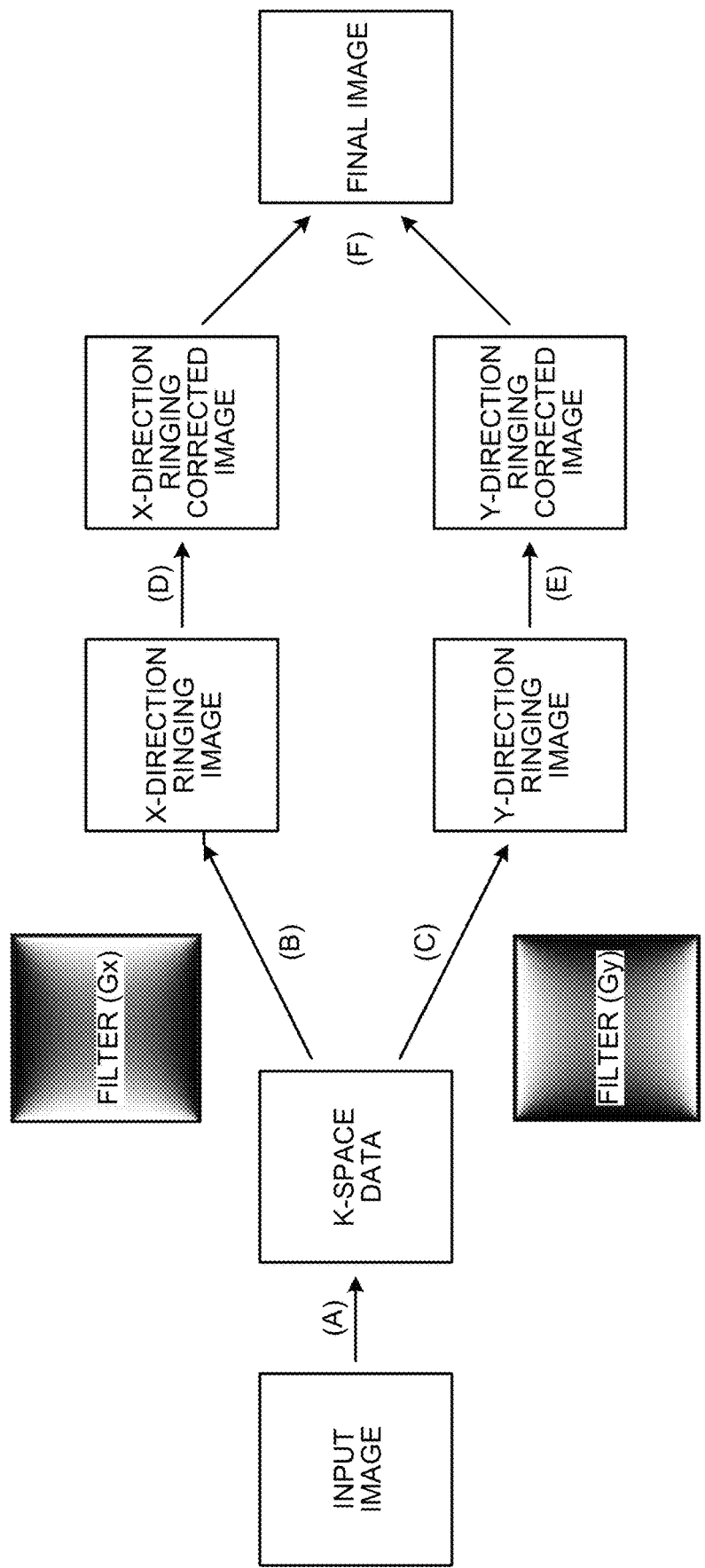

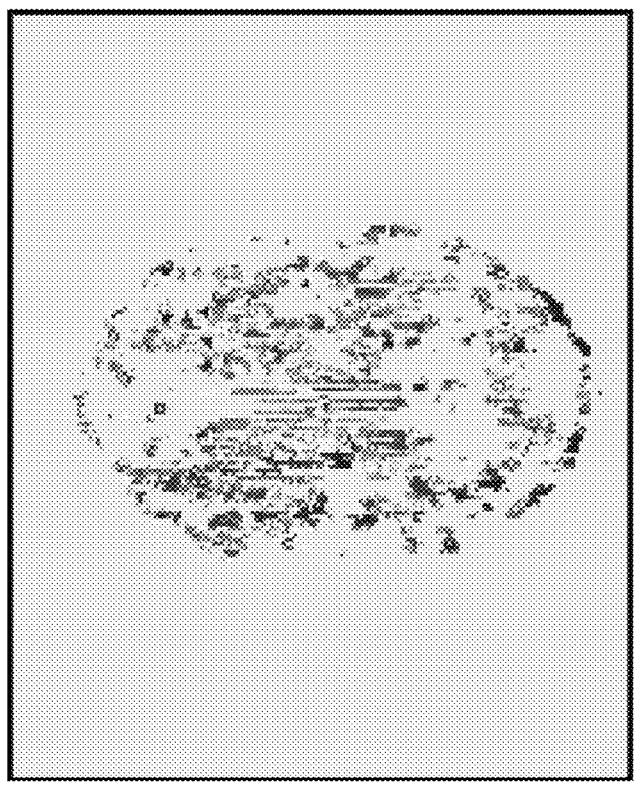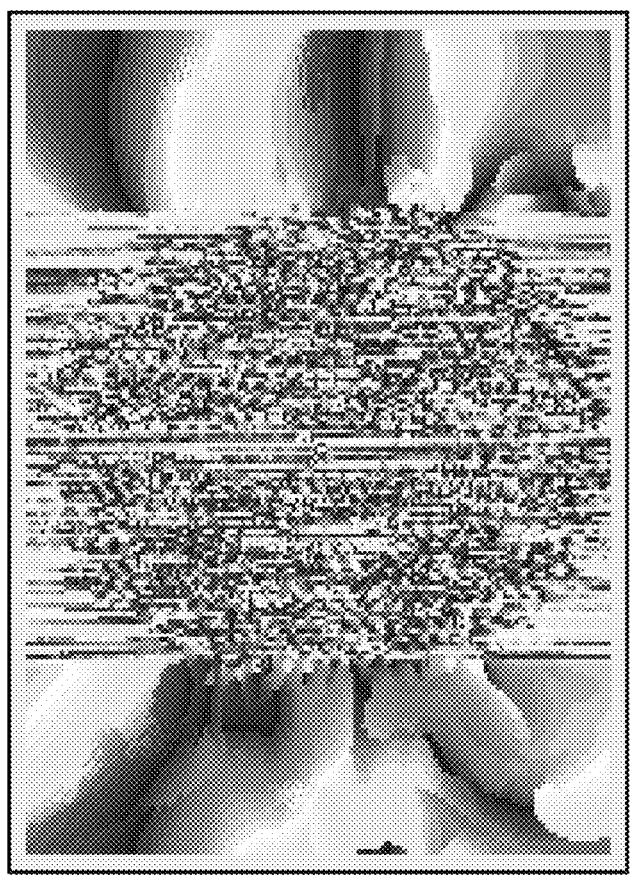

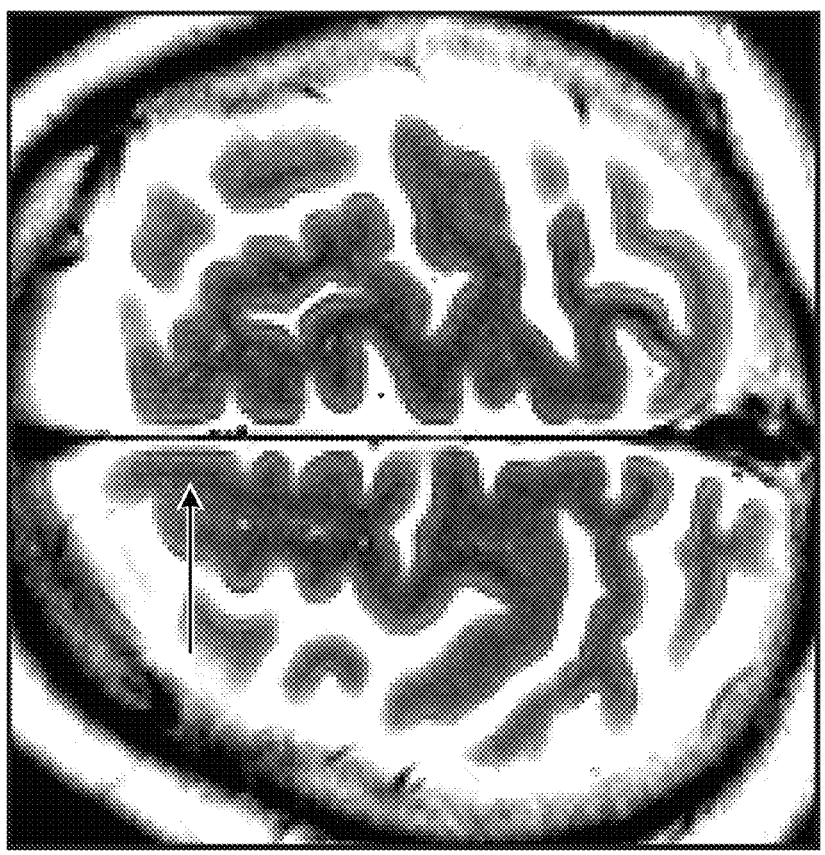
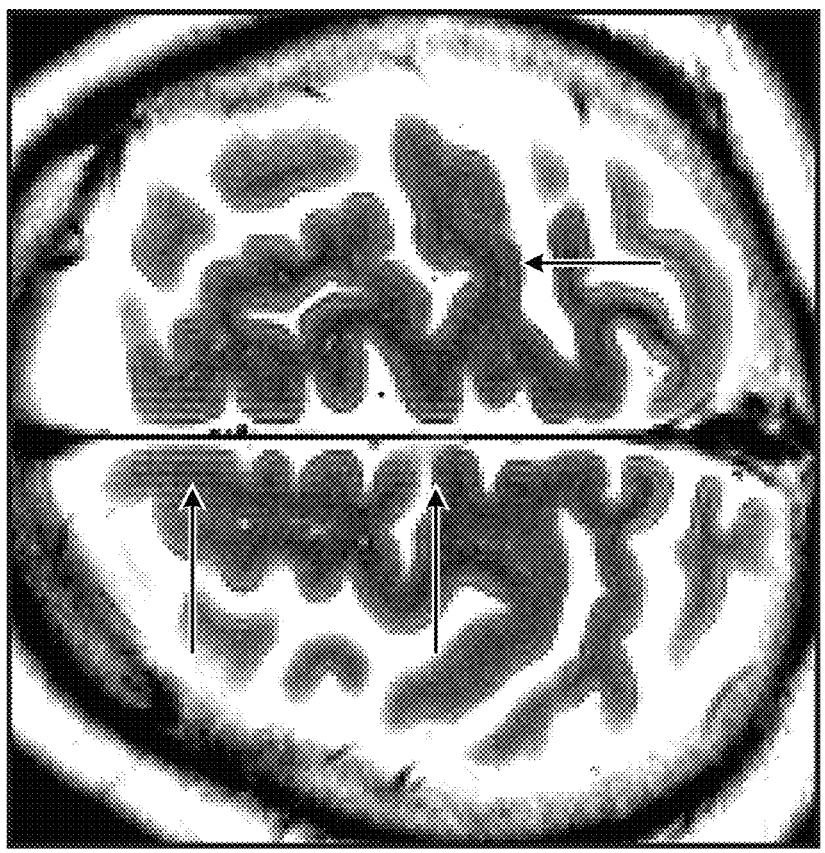
FIG.14B
FIG.14A

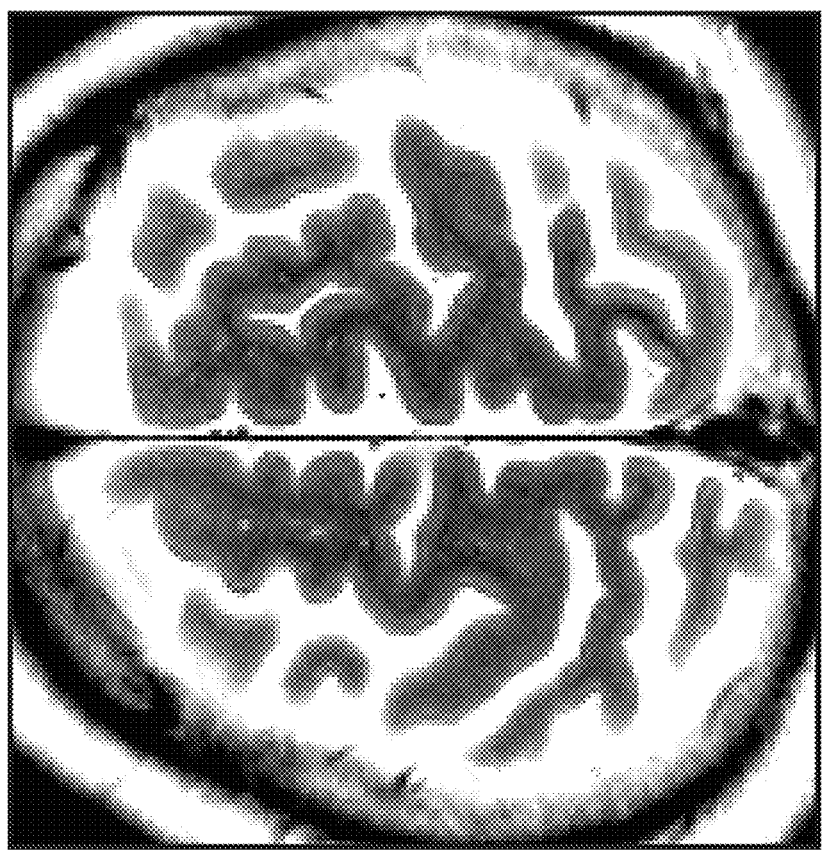
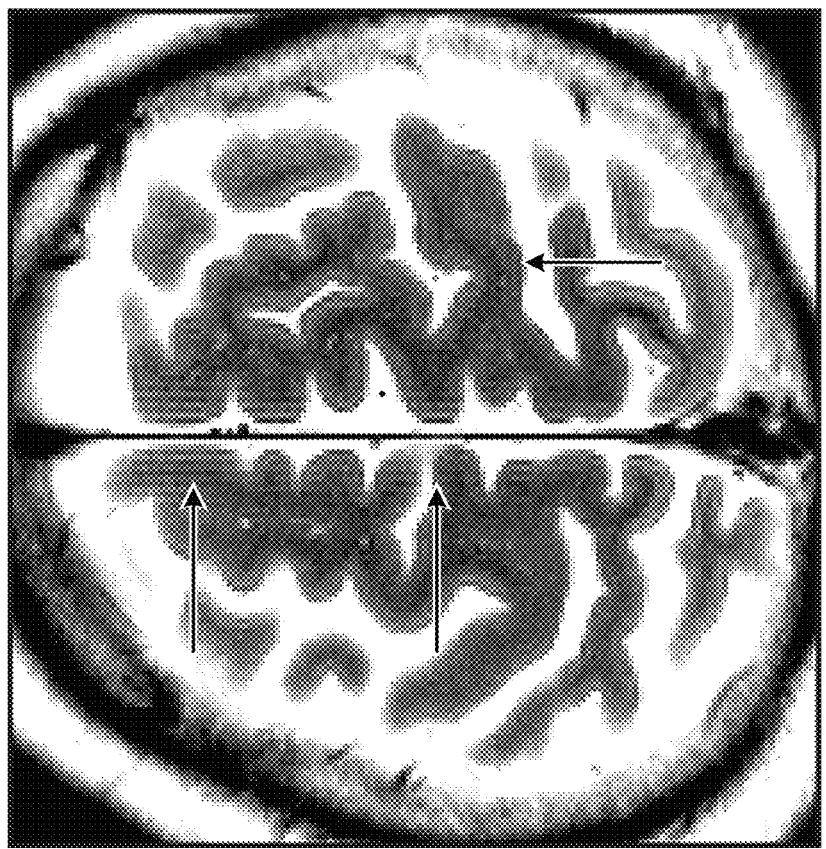
FIG.15B
FIG.15A

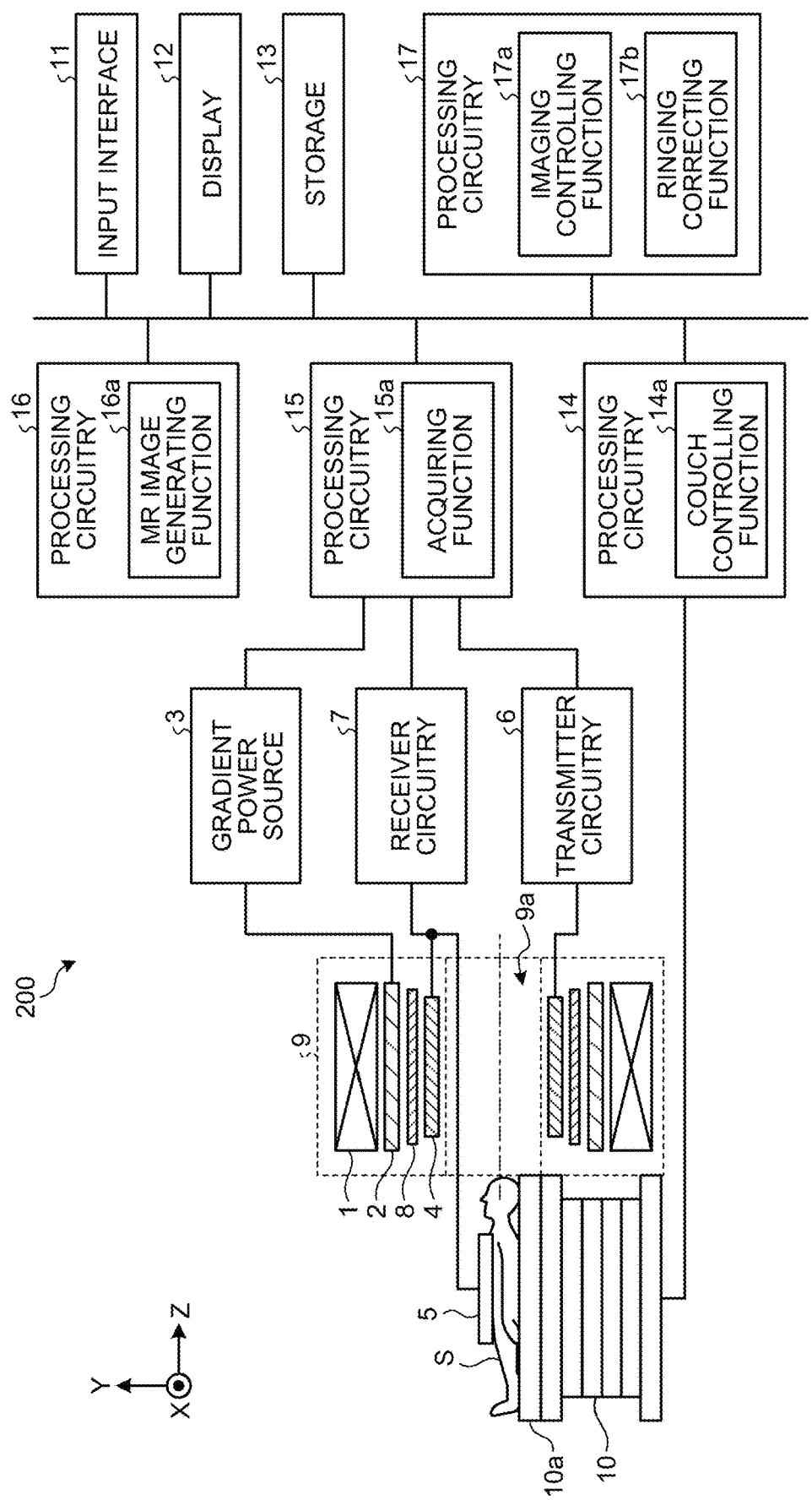

IMAGE PROCESSING APPARATUS, IMAGE PROCESSING METHOD, AND MAGNETIC RESONANCE IMAGING APPARATUS

CROSS-REFERENCE TO RELATED APPLICATIONS

This application is based upon and claims the benefit of priority from Japanese Patent Application No. 2022-140932, filed on Sep. 5, 2022; the entire contents of which are incorporated herein by reference.

FIELD

Embodiments described herein relate generally to an image processing apparatus, an image processing method, and a magnetic resonance imaging apparatus.

BACKGROUND

Generally speaking, it is known that Magnetic Resonance (MR) images taken by Magnetic Resonance Imaging (MRI) apparatuses may contain stripe artifacts, called ringing or truncation artifacts, in the vicinity of signal intensity boundaries where the intensity changes drastically and sharply.

Conventionally, various types of methods for correcting such ringing artifacts have been proposed. According to these methods, however, the processed image may be blurred in some situations as a result of performing a process to correct the ringing artifacts.

BRIEF DESCRIPTION OF THE DRAWINGS

FIG. 2 is a chart illustrating examples of process flow in ringing corrections performed by a ringing correcting function according to the first embodiment;

FIG. 12B illustrates improved continuity of shift amount obtained during the second pass relative to the first pass;

FIGS. 13A and 13B are drawings illustrating examples of, respectively, first-pass (initial) and second-pass (final) shift amount determination processes along an image y axis, performed by the ringing correcting function according to the first embodiment; FIG. 13B illustrates improved continuity of shift amount obtained during the second pass relative to the first pass;

FIGS. 14A and 15A are drawings illustrating an MR image (both drawings are the same image) such as those that may be input to the image processing apparatus according to the first embodiment;

FIG. 14B is a drawing illustrating an output from a conventional method for ringing reduction; specifically, it illustrates the image obtained when a spatial smoothing process that employs a low-pass filter is applied to the MR image illustrated in FIG. 14A;

FIG. 15B is a drawing illustrating an output from, and illustrating advantageous effects of, the ringing correction included in the image processing apparatus according to the first embodiment;

FIG. 17A illustrates a first-pass shift amount determination process along an image x axis performed by the ringing correcting function according to the first embodiment; FIG. 17B illustrates reduced ringing relative to an input image (FIG. 16), in an intermediate ringing-corrected image based on a first-pass shift amount determination process along an image x axis performed by the ringing correcting function according to the first embodiment;

FIG. 18A illustrates a second-pass shift amount determination process along an image x axis performed by the ringing correcting function according to the first embodiment; FIG. 18B illustrates reduced ringing relative to an input image (FIG. 16), and more faithful depiction of details from that input image relative to an intermediate ringing-corrected image based on a first-pass shift amount determination process (FIG. 17A), in an example of output from the image processing apparatus according to the first embodiment; and FIG. 19 is a diagram illustrating an exemplary configuration of an MRI apparatus according to a second embodiment.

DETAILED DESCRIPTION

An image processing apparatus according to an embodiment includes an acquiring unit and a correcting unit. The acquiring unit is configured to acquire a magnetic resonance image. The correcting unit is configured to determine, with respect to each of the pixels included in the magnetic resonance image, a shift amount from the position of the pixel to a position where ringing artifacts will be reduced and configured to perform a ringing correction to correct the ringing artifacts occurring in the magnetic resonance image on the basis of the determined shift amounts. The correcting unit is configured to estimate, with respect to each of the pixels included in the magnetic resonance image, a local amplitude of ringing artifacts, and to perform the ringing correction on the magnetic resonance image, while determining the shift amount for each of the pixels so as to be approximately continuous with the shift amounts of adjacently positioned pixels, sequentially in descending order starting with pixels having a higher local amplitude on the basis of the result of estimating the local amplitudes of ringing artifacts.

Exemplary embodiments of an image processing apparatus, an image processing method, and an MRI apparatus will be explained in detail below, with reference to the accompanying drawings.

First Embodiment

Figure 1:
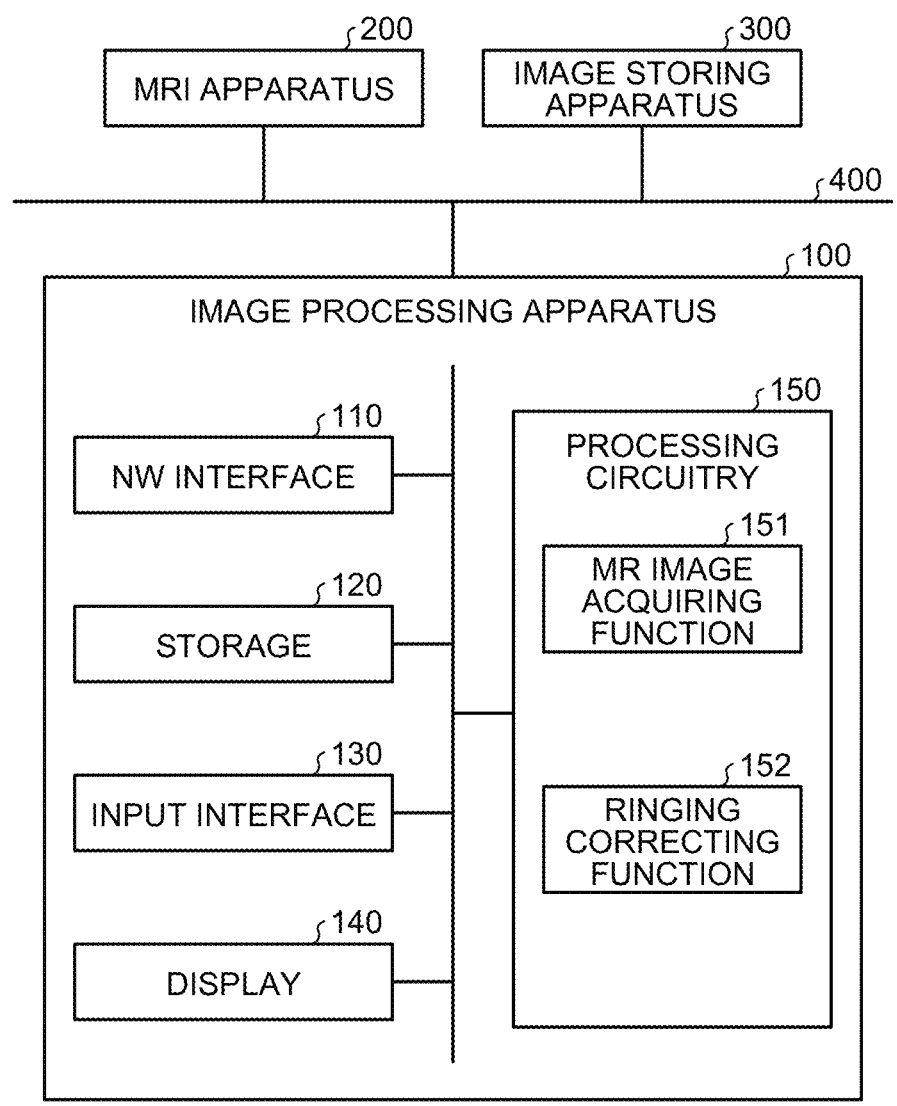
FIG. 1 is a diagram illustrating an exemplary configuration of an image processing apparatus according to a first embodiment.

FIG. 1 is a diagram illustrating an exemplary configuration of an image processing apparatus according to a first embodiment.

For example, as illustrated in FIG. 1, an image processing apparatus 100 according to the present embodiment is connected to an MRI apparatus 200 and an image storing apparatus 300 via a network 400 so as to be able to communicate with one another.

The MRI apparatus 200 is configured to take an image of a subject by employing magnetic resonance phenomena. More specifically, the MRI apparatus 200 is configured to apply a Radio Frequency (RF) pulse to the subject by executing any of various types of imaging sequences on the basis of an image acquisition condition set by an operator, to receive a Nuclear Magnetic Resonance (NMR) signal radiating from the subject owing to the influence of the RF pulse, and to acquire NMR data based on the NMR signal as k-space data. Further, the MRI apparatus 200 is configured to generate a two- or three-dimensional MR image by performing, on the acquired k-space data, image processing that may include a Fourier transform process or the like.

The image storing apparatus 300 is configured to store therein the MR image taken by the MRI apparatus 200. For example, the image storing apparatus 300 is realized by using a computer machine such as a Picture Archiving and Communication System (PACS) server and is configured to store therein the MR image in a format compliant with a Digital Imaging and Communications in Medicine (DICOM) scheme.

The image processing apparatus 100 is configured to process the MR image related to the subject. More specifically, the image processing apparatus 100 is configured to acquire the MR image from the MRI apparatus 200 or the image storing apparatus 300 via the network 400 and to process the acquired MR image. For example, the image processing apparatus 100 is realized by using a computer machine such as a workstation.

For example, the image processing apparatus 100 includes a network (NW) interface 110, a storage 120, an input interface 130, a display 140, and processing circuitry 150.

The NW interface 110 is configured to control transfer of various types of data and communication performed between the image processing apparatus 100 and other apparatuses via the network 400. More specifically, the NW interface 110 is connected to the processing circuitry 150 and is configured to transmit data received from any of the other apparatuses to the processing circuitry 150 and to transmit data received from the processing circuitry 150 to any of the other apparatuses. For example, the NW interface 110 is realized by using a network card, a network adaptor, a Network Interface Controller (NIC), or the like.

The storage 120 is configured to store therein various types of data and various types of programs. More specifically, the storage 120 is connected to the processing circuitry 150 and is configured to store therein data received from the processing circuitry 150 and to read and transmit data stored therein to the processing circuitry 150. For example, the storage 120 is realized by using a semiconductor memory element such as a Random Access Memory (RAM) or a flash memory, or a hard disk, an optical disk, or the like.

The input interface 130 is configured to receive operations that specify various types of instructions and various types of information from the operator. More specifically, the input interface 130 is connected to the processing circuitry 150 and is configured to convert the input operations received from the operator into electrical signals and to transmit the electrical signals to the processing circuitry 150. For example, the input interface 130 is realized by using a trackball, a switch button, a mouse, a keyboard, a touchpad on which an input operation can be performed by touching an operation surface thereof, a touch screen in which a display screen and a touchpad are integrally formed, a contactless input interface using an optical sensor, an audio input interface, and/or the like. In the present disclosure, the input interface 130 does not necessarily have to include physical operation component parts such as a mouse, a keyboard, and/or the like. For instance, possible examples of the input interface 130 include electrical signal processing circuitry configured to receive an electrical signal corresponding to an input operation from an external input machine provided separately from the apparatus and to transmit the electrical signal to controlling circuitry.

The display 140 is configured to display various types of information and various types of data. More specifically, the display 140 is connected to the processing circuitry 150 and is configured to display various types of information and various types of data received from the processing circuitry 150. For example, the display 140 is realized by using a liquid crystal monitor, a Cathode Ray Tube (CRT) monitor, a touch panel, or the like.

The processing circuitry 150 is configured to perform various types of processes by controlling constituent elements included in the image processing apparatus 100. For example, the processing circuitry 150 is configured to perform the various types of processes in accordance with input operations received from the operator via the input interface 130. Further, for example, the processing circuitry 150 is configured to store the data received by the NW interface 110 from the other apparatuses into the storage 120. Also, for example, the processing circuitry 150 is configured to transmit data read from the storage 120 to any of the other apparatuses, by transmitting the data to the NW interface 110. Further, for example, the processing circuitry 150 is configured to cause the display 140 to display any of the data read from the storage 120.

The image processing apparatus 100 according to the present embodiment configured as described above has a function to correct ringing artifacts in the MR image.

In relation to the above, various types of methods have hitherto been proposed as methods for correcting ringing artifacts. According to those methods, however, the processed image may be blurred in some situations as a result of performing a process to correct the ringing artifacts.

For instance, examples of methods for correcting ringing artifacts include a method in which a smoothing (or filtering) process is performed by applying a low-pass filter to k-space data, and a method that employs sub-voxel shifts (for example, refer to Elias Kellner, Bibek Dhital, Valerij G. Kiselev, Marco Reisert, "Gibbs-ringing artifact removal based on local subvoxel-shifts", Magn Reson Med 76:1574-1581, 2016).

According to the method in which a smoothing process is performed by applying a low-pass filter to k-space data, although ringing artifacts can be reduced or eliminated, the output image will be blurred because higher spatial frequencies in the original MR image are suppressed. The method that employs sub-voxel shifts is able to preserve some of the higher spatial frequencies and provides an alternative to the smoothing/low-pass filtering method.

According to the method employing sub-voxel shifts, with respect to each of the pixels included in the MR image, a shift amount from the position of the pixel to a position where ringing artifacts will be reduced, is determined so as to correct the ringing artifacts occurring in the MR image on the basis of the determined shift amounts. However, because the shift amount is determined independently for each of the pixels, while continuity of shift amount between adjacently positioned pixels is ignored, a noticeable level of blur is typically induced in the image.

To improve on these circumstances, the image processing apparatus 100 according to the present embodiment is configured to be able to provide an MR image in which ringing artifacts have been corrected or reduced, and which is less blurred than an MR image processed by a conventional method for countering ringing artifacts.

More specifically, the processing circuitry 150 includes an MR image acquiring function 151 and a ringing correcting function 152. In this situation, the MR image acquiring function 151 is an example of the acquiring unit. The ringing correcting function 152 is an example of the correction unit.

From the MRI apparatus 200 or the image storing apparatus 300, the MR image acquiring function 151 is configured to acquire an MR image on which a ringing artifact correction process is to be performed.

More specifically, from the MRI apparatus 200 or the image storing apparatus 300, the MR image acquiring function 151 is configured to acquire the MR image to be processed and to store the acquired MR image into the storage 120.

For example, the MR image acquiring function 151 is configured to receive, from the operator, an operation to designate the MR image to be processed, via the input interface 130. After that, from the MRI apparatus 200 or the image storing apparatus 300, the MR image acquiring function 151 is configured to acquire the MR image designated by the operator through the operation and to store the acquired MR image into the storage 120.

With respect to each of the pixels included in the MR image acquired by the MR image acquiring function 151, the ringing correcting function 152 is configured to determine a shift amount from the position of the pixel to a position where the ringing artifacts will be reduced, and to perform a ringing correction to correct the ringing artifacts occurring in the MR image on the basis of the determined shift amounts.

More specifically, the ringing correcting function 152 is configured to read, from the storage 120, the MR image acquired by the MR image acquiring function 151 and to perform the ringing correction on the read MR image.

In this situation, the ringing correcting function 152 is configured to perform the ringing correction on the MR image to be processed, by using a ringing correcting method that employs sub-voxel shifts.

FIG. 2 is a chart illustrating examples of process flow in the ringing correction performed by the ringing correcting function 152 according to the first embodiment.

For example, as illustrated in FIG. 2, the ringing correcting function 152 is configured to generate an output image in which ringing artifacts have been corrected by using the MR image to be processed as an input image and performing the ringing correction on the input image. In the present example, a situation will be explained in which the MR image to be processed is a two-dimensional MR image defined with an X direction (a readout direction) and a Y direction (a phase encoding direction) that are orthogonal to each other.

To begin with, while using the MR image to be processed as an input image, the ringing correcting function 152 is configured to transform the input image into k-space data by performing a Fourier transform, or an inverse Fourier transform, on the input image (FIG. 2, (A)).

Subsequently, the ringing correcting function 152 is configured to generate a ringing image in which ringing artifacts along the X direction are emphasized, by applying a filter (Gx) that suppresses higher spatial frequency components in the Y direction, to the k-space data of the input image (FIG. 2, (B)). In the following sections, this ringing image will be referred to as an X-direction ringing image.

Further, similarly to the X direction, the ringing correcting function 152 is configured, regarding the Y direction also, to generate a ringing image in which ringing artifacts along the Y direction are emphasized, by applying a filter (Gy) that suppresses higher spatial frequency components in the X direction, to the k-space data of the input image (FIG. 2, (C)). In the following sections, this ringing image will be referred to as a Y-direction ringing image.

After that, the ringing correcting function 152 is configured to generate a ringing-corrected image in which ringing artifacts along the X direction have been corrected, by performing a ringing correction on the X-direction ringing image (FIG. 2, (D)). In the following sections, this ringing-corrected image will be referred to as an X-direction ringing-corrected image.

More specifically, the ringing correcting function 152 is configured to generate images Is(x), the quantity of which is equal to 2M, by calculating with respect to each of the pixels included in the X-direction ringing image a signal value at the position obtained by shifting the X-direction coordinate x within the image space, by the shift amounts s/2M, according to Expression (1) presented below.

$$I_s(x) = \frac{1}{N}\sum_{k=0}^{N-1} c_0(k) \cdot e^{\frac{-2\pi i}{N}k\left(x+\frac{s}{2M}\right)} \quad (1)$$

In Expression (1) presented above, sub-voxel shifts are introduced into the calculation formula expressing the mathematical function known as an inverse Fourier transform. In Expression (1), x denotes the X-direction coordinate within the image space; k denotes the X-direction spatial frequency coordinate in the k-space; N is the number of signals to be sampled; and $c_0(k)$ denotes a Fourier expansion coefficient.

Further, s denotes an integer from a set of integers for defining the shift amounts used in the ringing correction. The set of integers may be expressed as −M, . . . , and M, or a subset of this set may be used instead. For example, if M is 4, and if the subset −M, . . . , and M−1 is used, then s has values of −4, −3, −2, −1, 0, 1, 2, and 3. The resulting shift amounts of the images would be −0.5, −0.375, −0.25, −0.125, 0, 0.125, 0.25, and 0.375 pixel.

After that, on the basis of the 2M images that were generated, the ringing correcting function 152 is configured, with respect to each of the pixels included in the ringing image, to determine a shift amount from the position of the pixel to a position where ringing artifacts will be reduced.

Figure 3A:
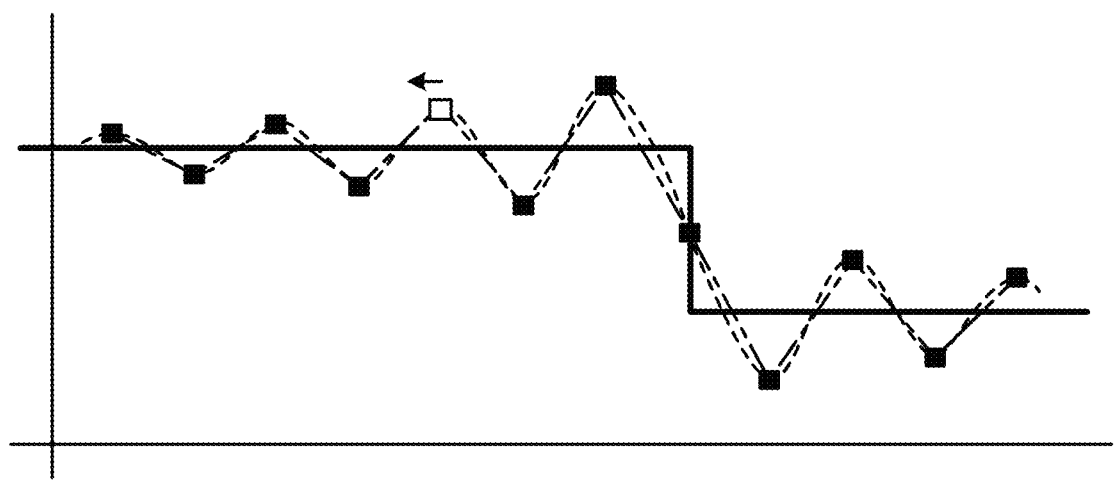
FIGS. 3A and 3B are charts illustrating an example of estimating the optimal shift amount along one axis, for one pixel, in the ringing correction performed by the ringing correcting function according to the first embodiment.
Figure 3B:
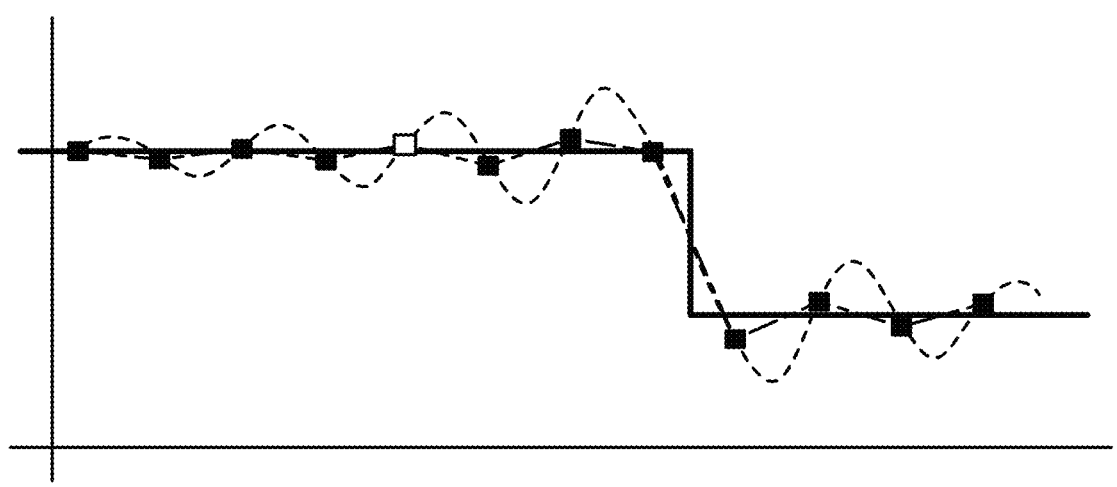

FIGS. 3A and 3B are charts illustrating examples of determining the shift amounts in the ringing correction performed by the ringing correcting function 152 according to the first embodiment.

More specifically, FIG. 3A illustrates changes in signal values in the vicinity of boundaries in an image before the positions of the pixels are shifted. FIG. 3B illustrates changes in signal values in the vicinity of boundaries in an image after the positions of the pixels are shifted in the X direction. Further, in FIGS. 3A and 3B, the vertical axis of the chart expresses the signal values, whereas the horizontal axis serves as the coordinate axis in the X direction within the image space. Furthermore, the solid lines in the chart express ideal changes in the signal values in the vicinity of boundaries in real space, whereas broken lines express changes in the signal values in the vicinity of boundaries in the image space. The sections exhibiting larger undulation changes correspond to ringing artifacts. Further, the plurality of square dots in the chart represents positions of the pixels included in the image. The dashed lines express signal values obtained when a linear interpolation is performed between the pixels.

For example, as illustrated in FIG. 3B, the ringing correcting function 152 is configured, in the image after the positions of the pixels have been shifted, to calculate the difference in signal values between each of the pixels (e.g., the white square dot in FIG. 3B) and a predetermined number of pixels in the surroundings of the pixel and to determine a shift amount that minimizes the sum of the calculated differences. In the following sections, the sum of the differences in the signal values with respect to the predetermined number of pixels in the surroundings of the pixel will be referred to as the total variation for that pixel.

After that, by performing a linear interpolation while using the signal values in the positions reached by shifting the positions of the pixels by the determined shift amounts, the ringing correcting function 152 is configured to calculate, with respect to each of the pixels, a signal value at the original unshifted position of the pixel and to set the pixel value to this calculated signal value. As a result, an image in which ringing artifacts along the X direction have been corrected, i.e., the X-direction ringing-corrected image, has been generated.

Returning to the description of FIG. 2, similarly to the X direction, the ringing correcting function 152 is configured, regarding the Y direction also, to generate a ringing-corrected image in which the ringing artifacts along the Y direction have been corrected, by performing a ringing correction on the Y-direction ringing image, similarly to the X direction (FIG. 2, (E)). In the following sections, this ringing-corrected image will be referred to as a Y-direction ringing-corrected image.

After that, the ringing correcting function 152 is configured to generate a ringing-corrected image in which the ringing artifacts along the X direction and the Y direction have been corrected, as a final image, by adding together the X-direction ringing-corrected image and the Y-direction ringing-corrected image that were generated (FIG. 2, (F)).

A basic flow in the ringing correction performed by the ringing correcting function 152 has thus been explained. However, in the ringing correction described above, if the shift amount of each of the pixels was determined from among the full range of shift amounts used in the ringing correction, continuity of shift amount between adjacently positioned pixels would be ignored, and as a result, the image would become blurred.

To improve on this situation, in the present embodiment, the ringing correcting function 152 is configured to perform the ringing correction described above on the MR image to be processed, while taking into account the continuity of shift amount between adjacently positioned pixels (that is, from pixel to neighboring pixel) as explained below.

Figure 4:
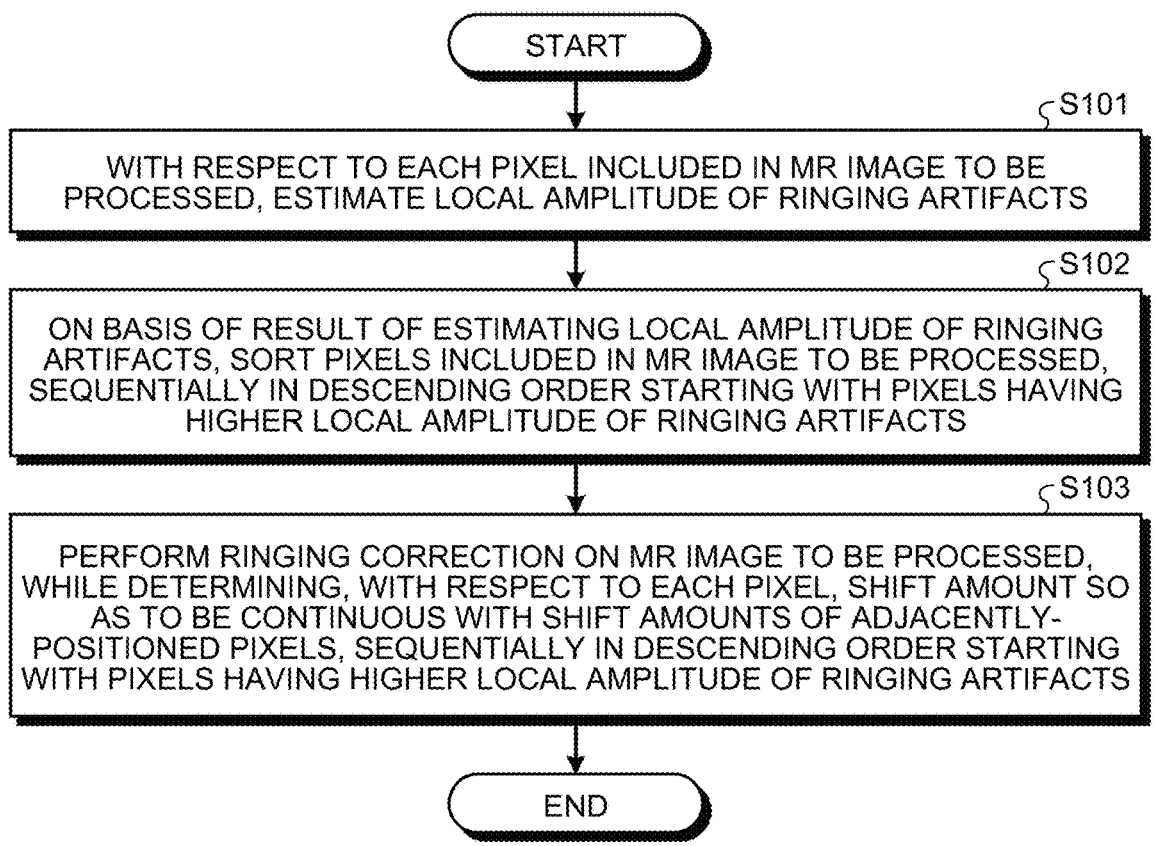
FIG. 4 is a flowchart illustrating a processing procedure in the ringing correction performed by the ringing correcting function according to the first embodiment.

FIG. 4 is a flowchart illustrating a processing procedure in the ringing correction performed by the ringing correcting function 152 according to the first embodiment.

For example, as illustrated in FIG. 4, to begin with, the ringing correcting function 152 estimates a local amplitude of ringing artifacts, with respect to each of the pixels included in the MR image to be processed in which the ringing artifacts are to be corrected (step S101).

More specifically, as a result of estimating the local amplitudes of ringing artifacts, the ringing correcting function 152 generates a ringing amplitude map indicating the local amplitude of ringing artifacts with respect to each of the pixels included in the MR image to be processed.

For example, by performing a first-pass (initial) ringing correction on a ringing image, the ringing correcting function 152 generates a difference image between the ringing image and the ringing-corrected image. Since the images generally have complex numbers as pixel values, the ringing correcting function 152 can first compute the magnitude image of the ringing image and the magnitude image of the ringing-corrected image. The ringing correcting function 152 then generates the difference image between these two magnitude images such that the difference image has pixel values that are real numbers (positive, negative, or zero). Finally, it computes the absolute value of each pixel value in the difference image as the ringing amplitude map, hereafter referred to simply as a "ringing map."

FIGS. 5 to 8 are drawings illustrating examples of the ringing map generating process performed by the ringing correcting function 152 according to the first embodiment.

Figure 5:
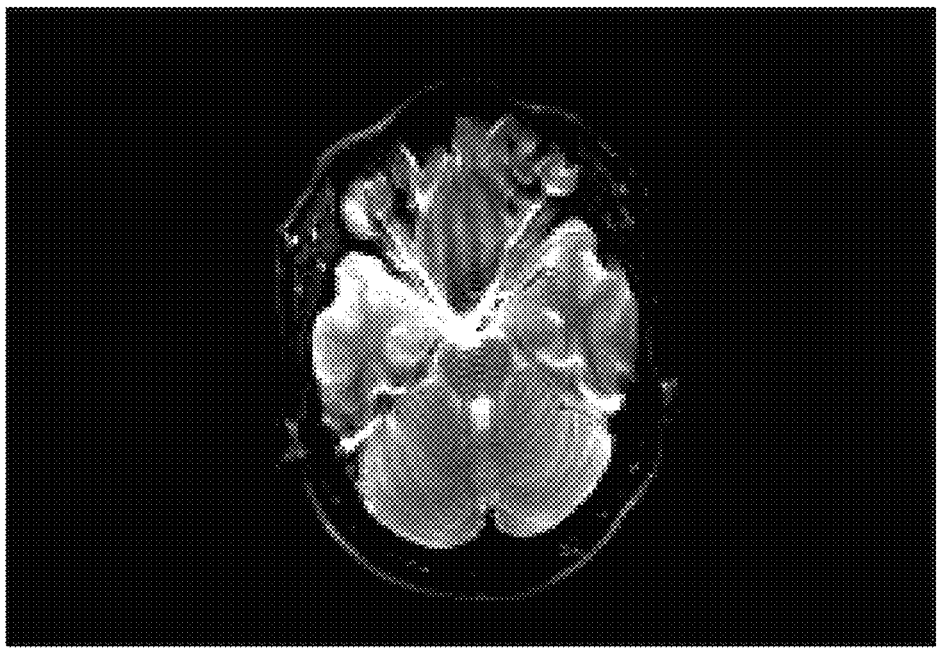
FIG. 5 is an MR image containing ringing artifacts that is an example of an input to the ringing correcting function according to the first embodiment.

For example, the ringing correcting function 152 generates an X-direction ringing image, a Y-direction ringing image, an X-direction ringing-corrected image, and a Y-direction ringing-corrected image, by performing the processes illustrated in FIG. 2 (A) to (E) on an MR image of a slice of the brain as illustrated in FIG. 5. In this situation, the ringing correcting function 152 determines a shift amount for each of the pixels from among all the shift amounts used in the ringing correction so as to generate an X-direction ringing-corrected image and a Y-direction ringing-corrected image.

Figure 6B:
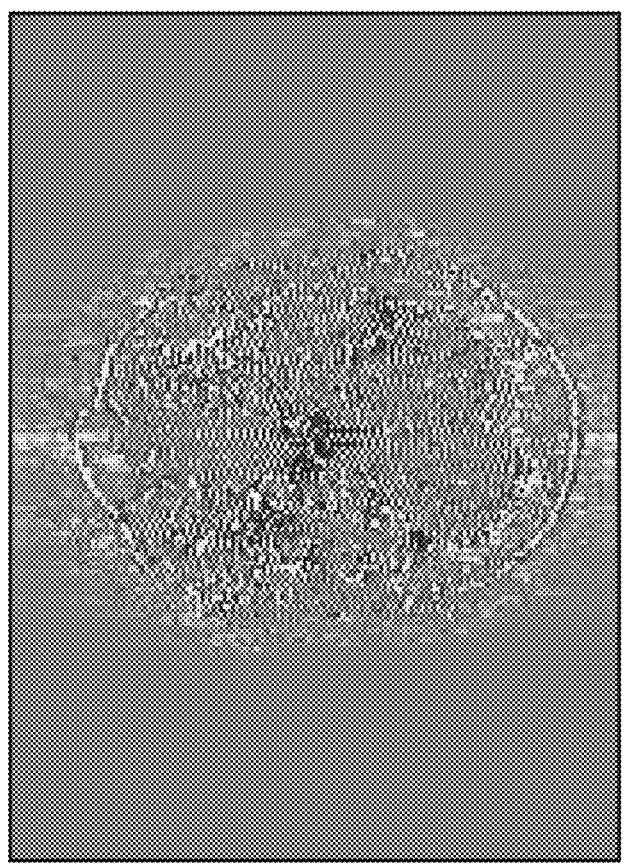
FIGS. 6A and 6B are drawings illustrating examples of a first step in the ringing map generation process performed by the ringing correcting function according to the first embodiment.
Figure 6A:
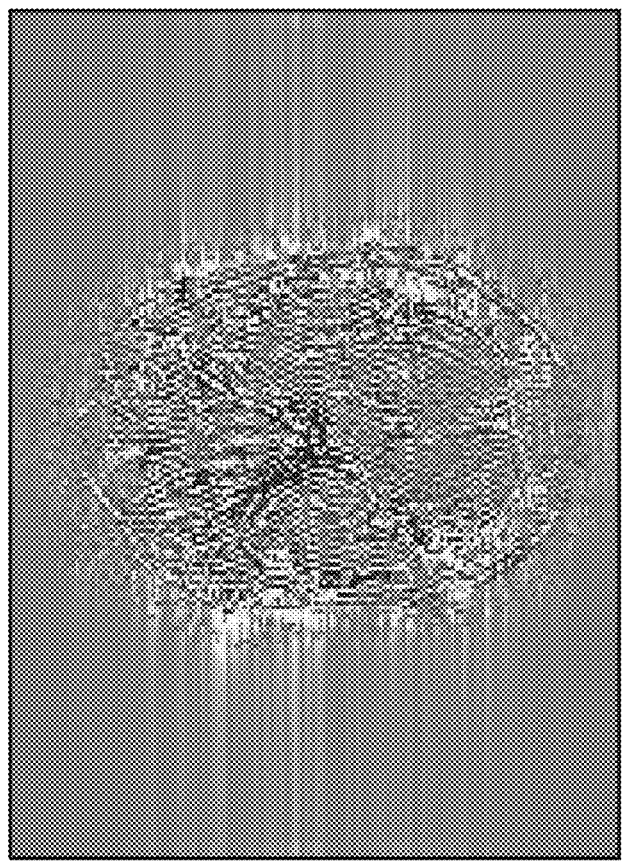

After that, the ringing correcting function 152 generates an X-direction ringing difference image as illustrated in FIG. 6A, by generating a magnitude image from the complex-valued X-direction ringing image and a magnitude image from the complex-valued X-direction ringing-corrected image, and further generating a difference image of the two. Further, similarly, the ringing correcting function 152 generates a Y-direction ringing difference image as illustrated in FIG. 6B, by generating a magnitude image from the Y-direction ringing image and a magnitude image from the Y-direction ringing-corrected image, and further generating a difference image of the two.

Figure 7:
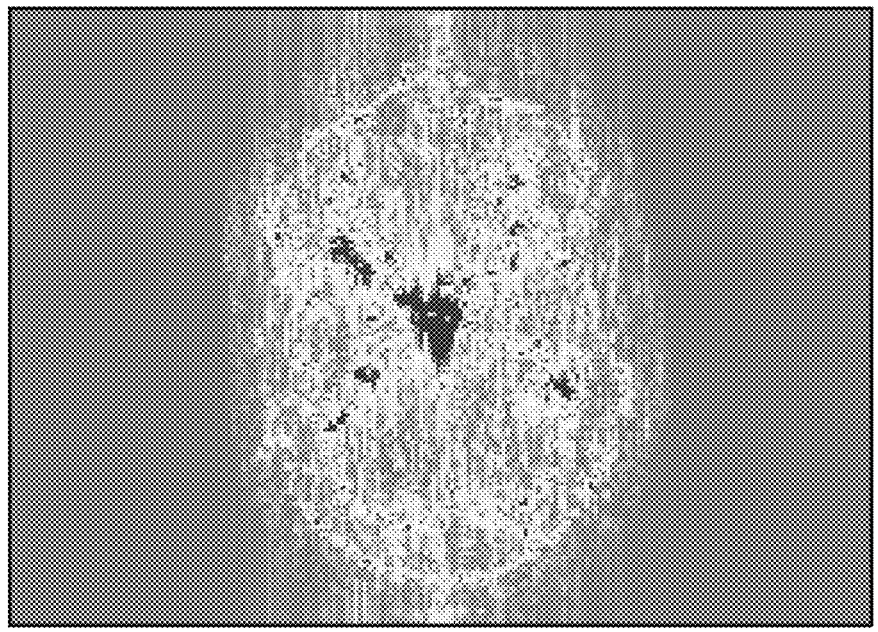
FIG. 7 is a drawing illustrating an example of a ringing amplitude map generated as a second step in the ringing map generation process performed by the ringing correcting function according to the first embodiment.

Subsequently, the ringing correcting function 152 generates an X-direction ringing amplitude map by computing the absolute value of each pixel value in the X-direction difference image. Further, similarly, the ringing correcting function 152 generates a Y-direction ringing amplitude map by computing the absolute value of each pixel value in the Y-direction difference image as illustrated in FIG. 7.

Figure 8:
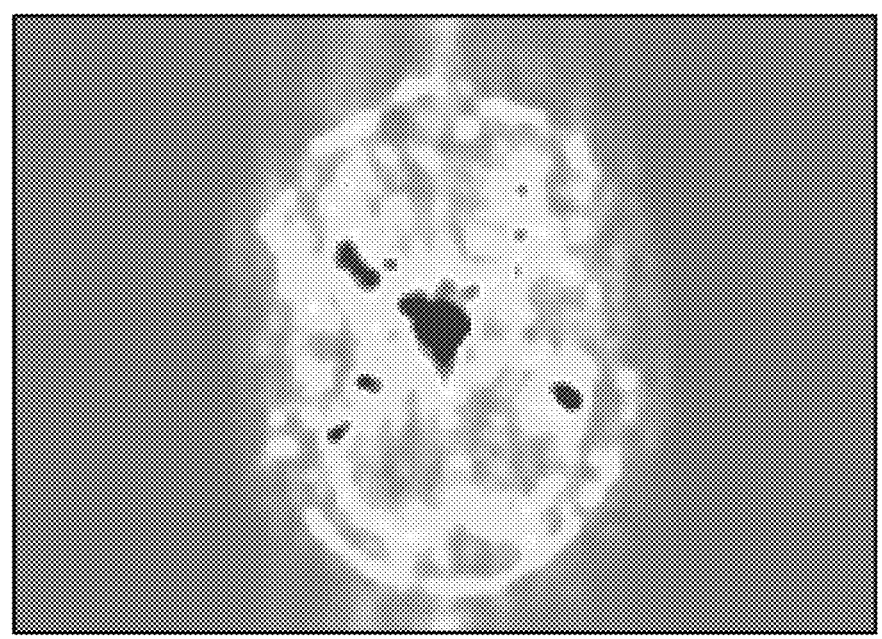
FIG. 8 is a drawing illustrating an example of a smoothed ringing amplitude map generated as a third step in the ringing map generation process performed by the ringing correcting function according to the first embodiment.

The ringing amplitude maps for the X- and Y-directions may be further processed according to a publicly known technique for a smoothing or filtering process, to obtain processed ringing maps. As an example of a processed ringing map, FIG. 8 illustrates a Y-direction ringing amplitude map that has been processed with a 2-dimensional smoothing filter.

In the description above, the example was explained in which the difference image between a ringing image and an initial ringing-corrected image was used to generate a ringing amplitude map, a type of ringing map. However, possible methods for generating a ringing map are not limited to this example.

For instance, the ringing correcting function 152 may generate a ringing map directly on the basis of the total variation values themselves instead of generating one based on a difference image between a ringing image and an initial ringing-corrected image. In this case, an initial ringing correction, performed as a means of estimating the local amplitudes of ringing artifacts, is not necessary.

Returning to the description of FIG. 4, subsequently, on the basis of the result of estimating the local amplitudes of ringing artifacts, the ringing correcting function 152 performs the ringing correction on the MR image to be processed, while determining the shift amount for each of the pixels so as to be approximately continuous with the shift amounts of adjacently positioned pixels, sequentially in descending order starting with pixels having a higher local amplitude.

More specifically, on the basis of the generated ringing map, the ringing correcting function 152 performs the ringing correction on the MR image to be processed, while determining the shift amount of each of the pixels, sequentially in descending order starting with the pixels having a higher local amplitude of ringing artifacts.

Even more specifically, on the basis of the result of estimating the local amplitude of ringing artifacts, the ringing correcting function 152 sorts the pixels included in the MR image to be processed, sequentially in descending order starting with the pixels having a higher local amplitude of ringing artifacts (step S102).

After that, the ringing correcting function 152 performs the ringing correction on the MR image to be processed, while determining, with respect to each of the pixels, the shift amount so as to be approximately continuous with the shift amounts of adjacently positioned pixels, sequentially in descending order starting with the pixels having a higher local amplitude of ringing artifacts (step S103).

At first, the ringing correcting function 152 sets a first threshold value related to the local amplitudes of ringing artifacts and a second threshold value smaller than the first threshold value.

In this situation, for example, the ringing correcting function 152 may be configured to set a reference amplitude value on the basis of the range of amplitudes of ringing artifacts across the MR image, in combination with the number of pixels included in the MR image. The ringing correcting function 152 may be further configured to compute the residual range of amplitudes of ringing artifacts after excluding trivially low amplitudes, or extremely high amplitudes, or both, as the range of amplitudes to consider when setting the reference amplitude value.

After that, the ringing correcting function 152 sets the first threshold value by multiplying the reference amplitude value by a predetermined first parameter. Also, the ringing correcting function 152 sets the second threshold value by multiplying the reference amplitude value by a second predetermined parameter smaller than the first parameter.

Figure 9:
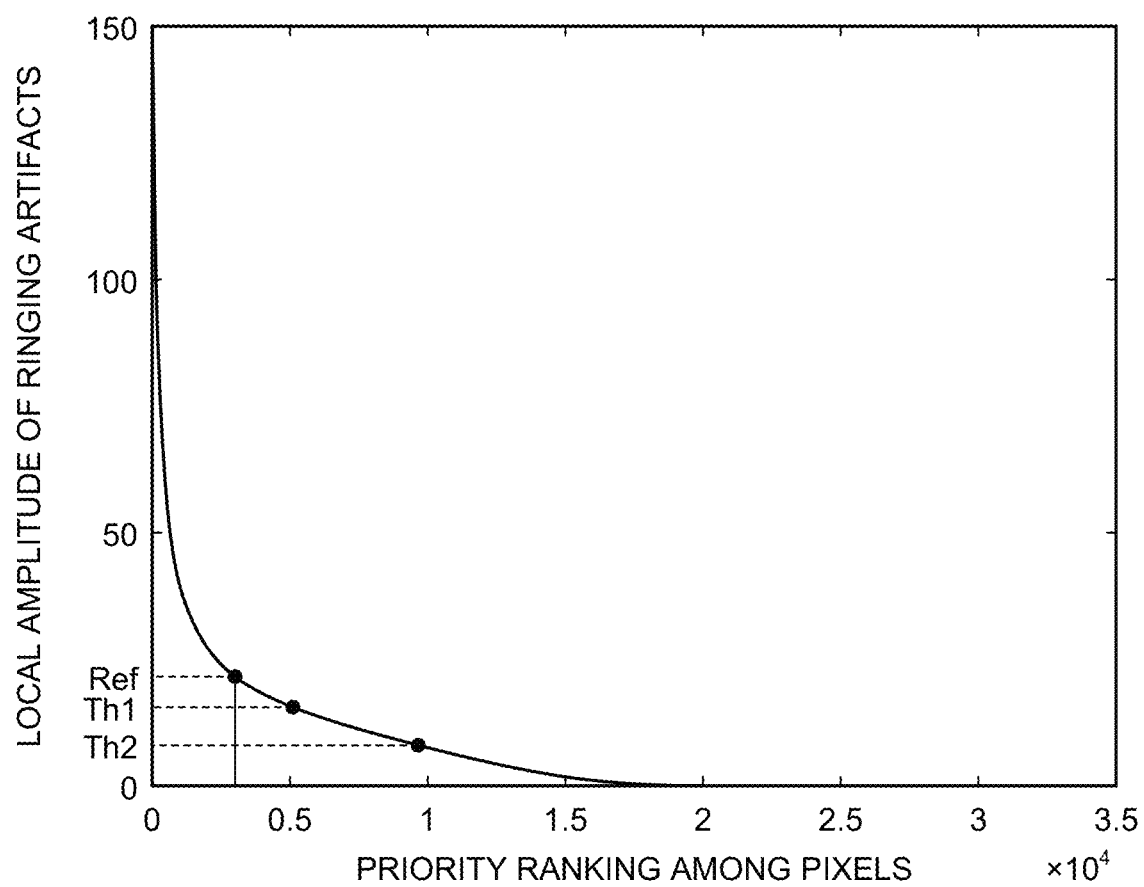
FIG. 9 is an example of a chart of local amplitude of ringing artifacts (chart y axis) and priority (chart x axis) for all pixels in an input image, illustrating a process of setting threshold values related to local amplitude of ringing artifacts, performed by the ringing correcting function according to the first embodiment.

FIG. 9 is a chart illustrating a first example of the process of setting the threshold values related to the local amplitudes of ringing artifacts, performed by the ringing correcting function 152 according to the first embodiment.

More specifically, FIG. 9 illustrates a result of sorting the pixels, in descending order starting with pixels having a higher local amplitude of ringing artifacts. Further, the vertical axis of the chart in FIG. 9 expresses the local amplitudes of ringing artifacts, whereas the horizontal axis expresses a priority ranking among the pixels, when pixels are defined with priority ranks, sequentially in descending order starting with the pixels having a higher local amplitude of ringing artifacts. In this situation, FIG. 9 illustrates an example in which the number of pixels included in the MR image is 35,000, while the local amplitudes of ringing artifacts are in the range from 0 to 150, and the pixels are defined with priority ranks from the 1st to the 35,000th places, sequentially in descending order starting with the pixels having a higher local amplitude of ringing artifacts.

In the first example, for example, as illustrated in FIG. 9, the ringing correcting function 152 derives a curve indicating changes in the local amplitude of ringing artifacts, with respect to the pixels sorted in descending order starting with the pixels having a higher local amplitude of ringing artifacts. Subsequently, the ringing correcting function 152 divides the area under the derived curve, to the right of the vertical axis, and above the horizontal axis of the chart in FIG. 9, into two sections along the horizontal axis direction and further sets the local amplitude of ringing artifacts in the priority rank at the position where the two sections have equal areas, as a reference value Ref.

After that, the ringing correcting function 152 sets a first threshold value Th1 by multiplying the set reference value Ref by the first parameter (e.g., 75%). Also, the ringing correcting function 152 sets a second threshold value Th2 by multiplying the reference value Ref by the second parameter (e.g., 40%) smaller than the first parameter. In this situation, the first parameter and the second parameter used by the ringing correcting function 152 are set by the operator in advance, for example.

FIGS. 10A to 10E are charts illustrating a second process for setting the threshold values related to the local amplitudes of ringing artifacts, performed by the ringing correcting function 152 according to the second embodiment.

In this second example, the ringing correcting function 152 first excludes the background from the input image.

Figure 10A:
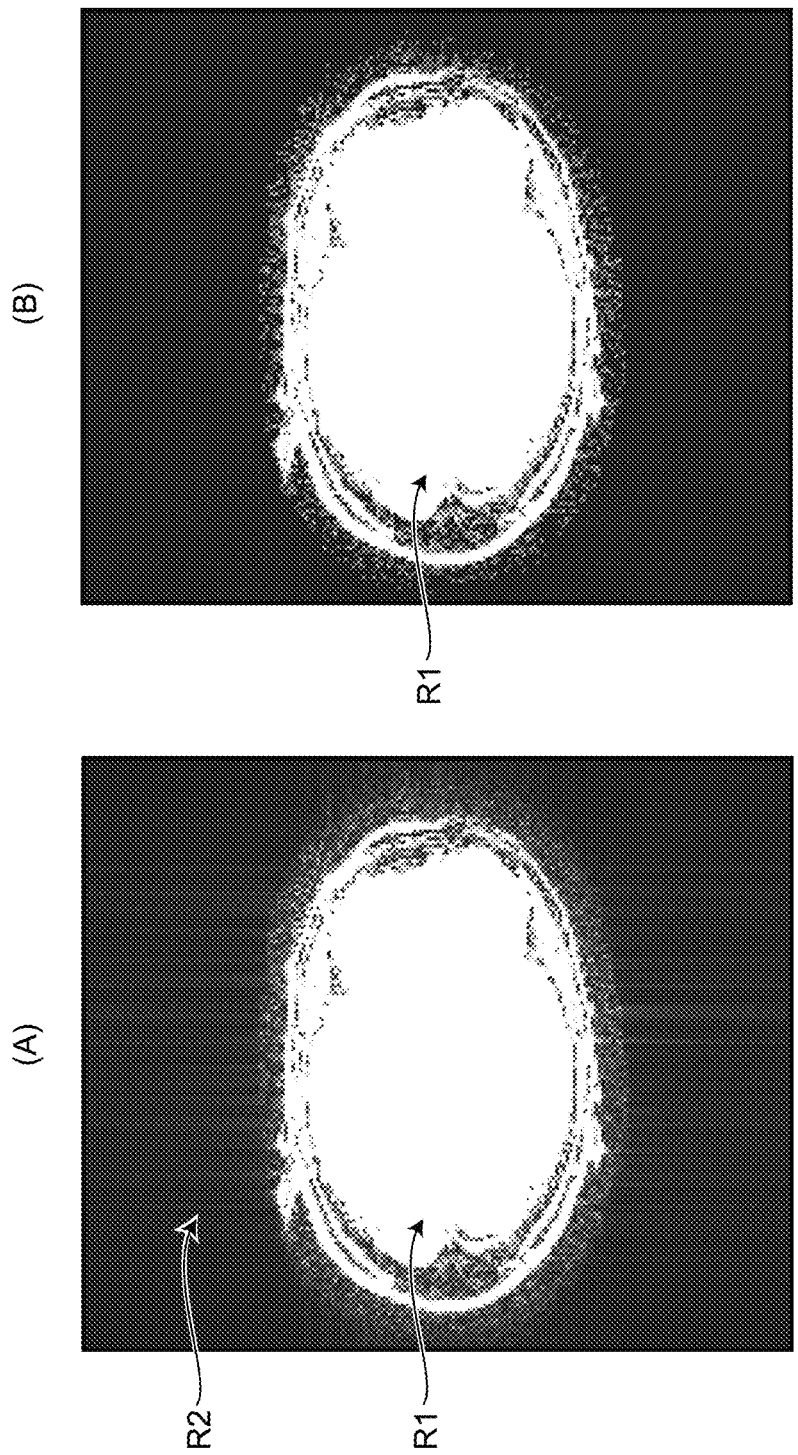
FIGS. 10A to 10E are charts illustrating a second of the process of setting the threshold values related to the local amplitude of ringing artifacts, performed by the ringing correcting function according to the second embodiment.

For example as, as illustrated in (A) of FIG. 10A, the input image includes a region R1 depicting the subject and a region R2 that is background. For example, the ringing correcting function 152 applies a masking process to the image based on the pixel values thereof, and thereby, as illustrated in (B) of FIG. 10A, excludes the background region R2 from the input image.

After that, the ringing correcting function 152 derives, based on an image from which the background has been excluded, similarly to the first example, a curve indicating changes in the local amplitude of ringing artifacts, with respect to the pixels sorted in descending order starting with the pixels having a higher local amplitude of ringing artifacts.

Figure 10B:
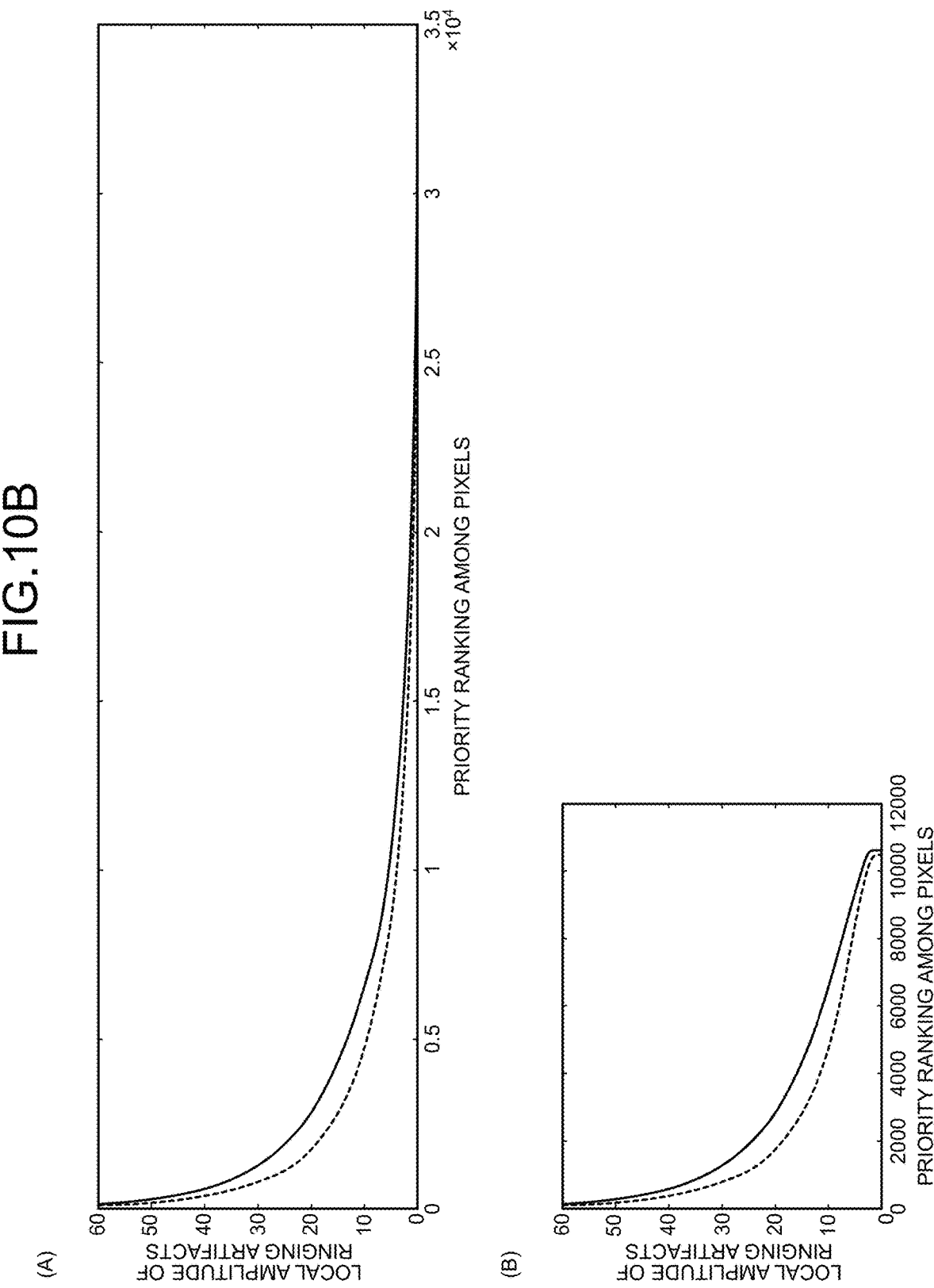

For example, (A) of FIG. 10B illustrates a curve derived from the image before the background was excluded, and (B) of FIG. 10B illustrates a curve derived from the image after the background was excluded. In FIG. 10B, in both (A) and (B), the solid-line curve and the dotted-line curve represent two different slices from one MRI scan.

If a curve is derived from an image before the background is excluded, as illustrated in (A) of FIG. 10B, the curve includes pixels in the background that have a low local amplitude of ringing artifacts. In contrast, when a curve is derived from an image after the background is excluded, as illustrated in (B) of FIG. 10B, the pixels in the background that have a low local amplitude of ringing artifacts are excluded from the curve.

After that, the ringing correcting function 152 excludes pixels having extremely high local amplitudes of ringing artifacts deemed to be outliers.

Figure 10C:
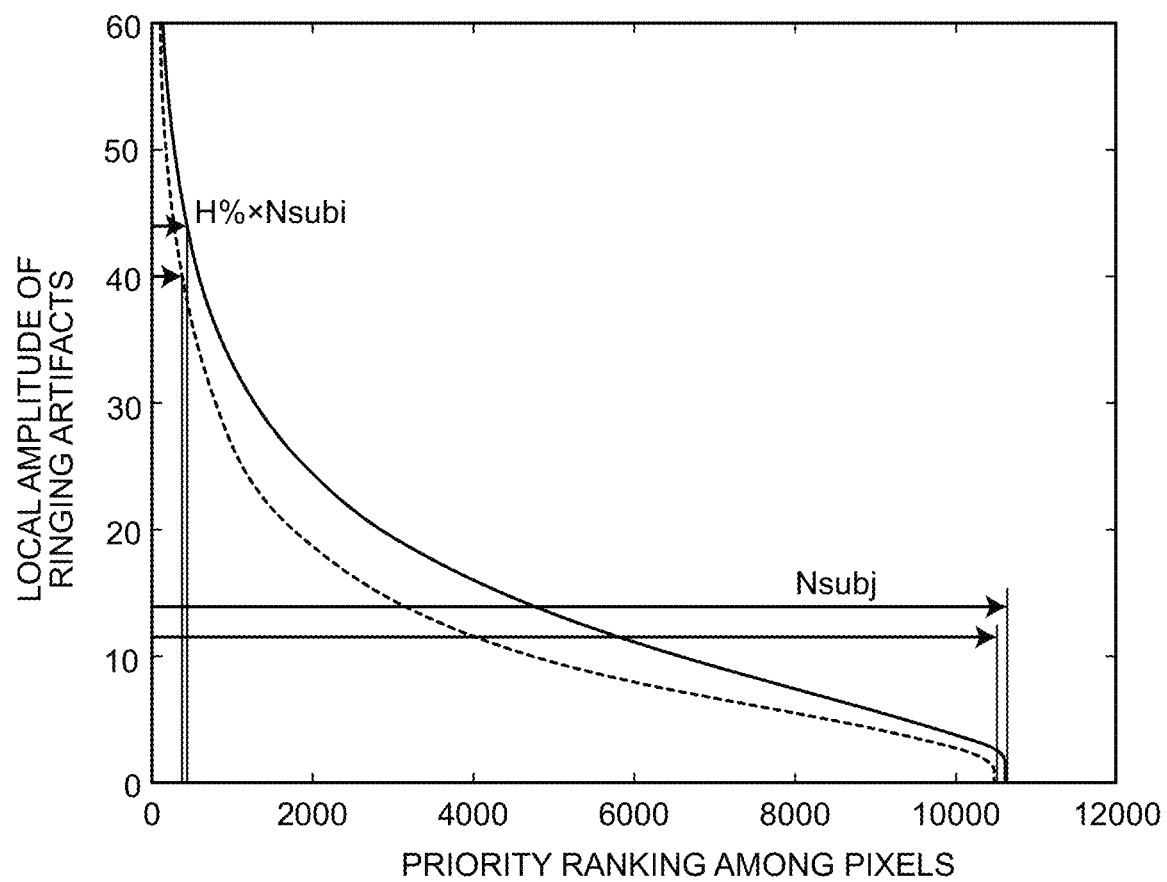

For example, as illustrated in FIG. 10C, the ringing correcting function 152 defines Nsubj, the number of pixels contained within the subject, and using a predetermined ratio H % (for example, 5%), excludes the H %×Nsubj pixels with the highest local amplitude. As illustrated in FIG. 10C, the number of pixels contained within the subject, Nsubj, depends on the slice position and many other variable factors, and accordingly, the number of excluded pixels H %×Nsubj also varies.

After that, the ringing correcting function 152 sets, based on the remaining (1−H %)×Nsubj pixels, a first threshold value and a second threshold value while considering the height of the curve's "tail" (a portion of pixels in the vicinity of the pixel with the lowest priority rank).

Figure 10D:
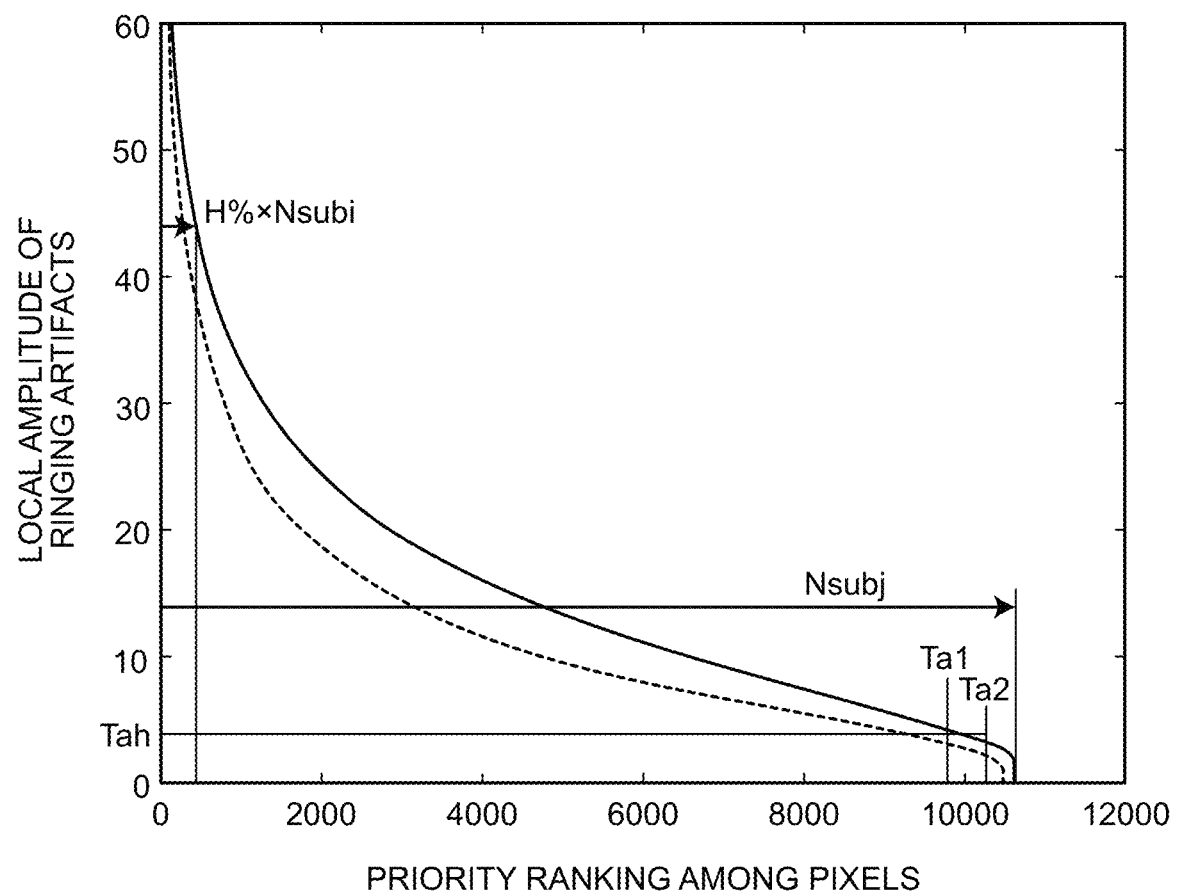

For example, as illustrated in FIG. 10D, the ringing correcting function 152, using a predetermined ratio RTa1 (for example, 5%) determines a pixel Ta1 such that the area under the curve to the right of Ta1 equals RTa1×the total area under the curve, and using a predetermined ratio RTa2 (for example, 2.5%) which is lower than RTa1 determines a pixel Ta2 such that the area under the curve to the right of Ta2 equals RTa2×the total area under the curve. In this situation, the ratios RTa1 and RTa2 used by the ringing correcting function 152 may be set identically for all slices, MRI sequences, subjects, etc., and may be set by the operator in advance, for example.

Then, the ringing correcting function 152 calculates the average height of the curve between the two pixels Ta1 and Ta2, and defines the calculated average as the height Tah of the curve's tail. One straightforward method to calculate Tah is provided by the following formula:

$$Tah = (totalTailArea - steepTailArea)/(Ta2 - Ta1)$$

where "totalTailArea" is the area under the curve between Ta1 and Nsubj, and "steepTailArea" is the area under the curve between Ta2 and Nsubj.

Although it is not illustrated in FIG. 10C, the height Tah as defined above depends on the characteristics of the input image, according to the curve thereof, and thus Tah will differ for each input image depending, for example, on the anatomy represented within the image and on the MRI sequence and parameters used to acquire it.

Figure 10E:
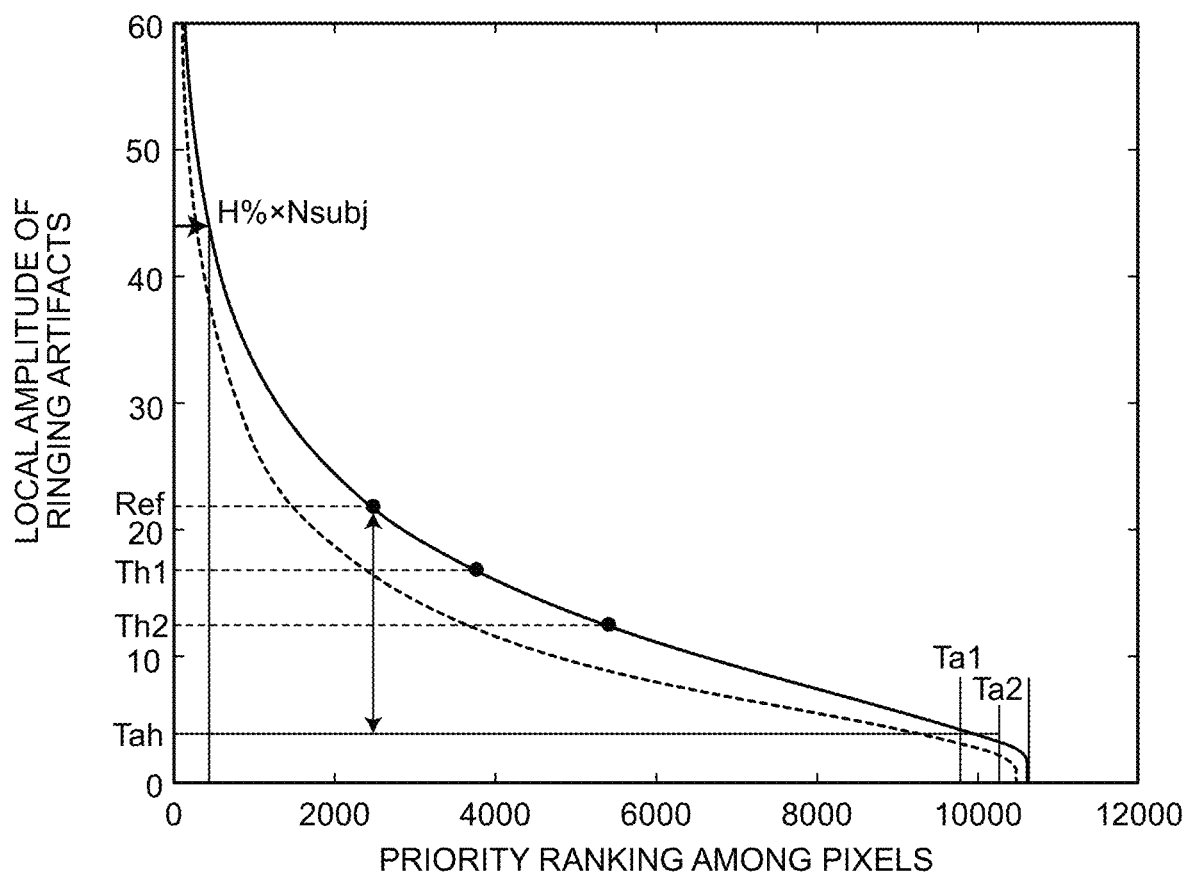

Subsequently, as illustrated in FIG. 10E, the ringing correcting function 152 computes the area under the curve, above a horizontal line with height Tah, to the right of a vertical line crossing the horizontal axis at H %×Nsubj. Further, it divides this area into two sections along the horizontal axis direction, and sets as a reference amplitude Ref the local amplitude in the priority rank at the position where the two sections have equal areas. Then a reference amplitude range may be defined as $$RefRange = Ref - Tah$$

After that, the ringing correcting function 152 sets, similarly to the first example, a first threshold value Th1 by multiplying the reference amplitude range RefRange by a first parameter (e.g., 30%). Also, the ringing correcting function 152 sets a second threshold value Th2 by multiplying RefRange by a second parameter (e.g., 20%) smaller than the first parameter. In this situation, the first parameter and the second parameter used by the ringing correcting function 152 are set by the operator in advance, for example. Although it is not illustrated in FIG. 10C, RefRange, Th1, and Th2 depend on the characteristics of the input image, according to the curve thereof, and thus RefRange, Th1, and Th2 will differ for each input image depending, for example, on the MRI sequence and parameters used to acquire it, and on the anatomy represented within the image.

Thus, the ringing correcting function 152 sets a first threshold value and a second threshold value for the X direction, based on the X-direction ringing map, and sets a first threshold value and a second threshold value for the Y direction, based on the Y-direction ringing map.

As explained above, the threshold values related to the local amplitudes of ringing artifacts are set on the basis of the range of amplitudes of ringing artifacts across the MR image, in combination with the number of pixels included in the MR image. Accordingly, it is possible to set the threshold values appropriately with consistent standards, even when the MR image to be processed has variations in image size (the number of rows in the X direction×the number of columns in the Y direction in the matrix), in the number of pixels exhibiting ringing artifacts, in the amplitudes of ringing artifacts, and the like. For example, it is possible to appropriately set the threshold values even when the MR image to be processed is drawn from a broad range of targeted body regions, slice positions, subjects, imaging dates/times, imaging parameters (e.g., pixel size and field of view), image types (e.g., a T1-weighted image, a T2-weighted image, a diffusion-weighted image), and the like.

In particular, the method of the second example allows the first and second parameters to be applied over a wider range of MRI sequences and image types, and is more robust compared with the method of the first example.

After that, the ringing correcting function 152 is configured to perform the ringing correction according to the flow illustrated in FIG. 2.

More specifically, to begin with, the ringing correcting function 152 is configured, while using the MR image to be processed as an input image, to transform the input image into k-space data by performing a Fourier transform, or an inverse Fourier transform, on the input image (FIG. 2, (A)).

Subsequently, the ringing correcting function 152 is configured to generate the X-direction ringing image in which ringing artifacts along the X direction are emphasized, by applying the filter (Gx) that suppresses higher spatial frequency components in the Y direction, to the k-space data of the input image (FIG. 2, (B)).

Further, similarly to the X direction, the ringing correcting function 152 is configured, regarding the Y direction also, to generate the Y-direction ringing image in which ringing artifacts along the Y direction are emphasized, by applying the filter (Gy) that suppresses higher spatial frequency components in the X direction, to the k-space data of the input image (FIG. 2, (C)).

After that, the ringing correcting function 152 is configured to generate the X-direction ringing-corrected image in which the ringing artifacts along the X direction have been corrected, by performing the ringing correction on the X-direction ringing image (FIG. 2, (D)).

In this situation, in the present embodiment, on the basis of the first threshold value and the second threshold value that have been set, the ringing correcting function 152 is configured, with respect to each of the pixels, to determine the shift amount so as to be approximately continuous with the shift amounts of adjacently positioned pixels, sequentially in descending order starting with the pixels having a higher local amplitude of ringing artifacts.

More specifically, with respect to each of the pixels of which the local amplitude of ringing artifacts is equal to or higher than the first threshold value, the ringing correcting function 152 is configured to determine the shift amount so as to be close to the shift amounts of adjacently positioned pixels.

In contrast, with respect to each of the pixels of which the local amplitude of ringing artifacts is lower than the first threshold value, the ringing correcting function 152 is configured to determine the shift amount so as to be close to the shift amounts of the adjacently positioned pixels and to subsequently adjust the determined shift amounts so that the shift amounts gradually diminish, sequentially in descending order starting with the pixels having a higher local amplitude.

Further, with respect to each of the pixels of which the local amplitude of ringing artifacts is lower than the second threshold value, the ringing correcting function 152 is configured to set the shift amount to 0.

For example, the ringing correcting function 152 is configured, with respect to each of the pixels, to define a group comprised of the plurality of adjacently positioned pixels and to further set a shift amount tolerance range on the basis of pixels included in the pixel group for which a shift amount was already determined.

FIGS. 11A to 11G are drawings illustrating examples of pixel groupings that could be employed by the ringing correcting function 152 according to the first embodiment.

Figure 11E:
FIGS. 11A to 11G are drawings illustrating examples of grouping and weighting process that may be used to enforce continuity of shift amounts of adjacently positioned pixels, during determination of a shift amount for each pixel performed by the ringing correcting function according to the first embodiment.
Figure 11F:
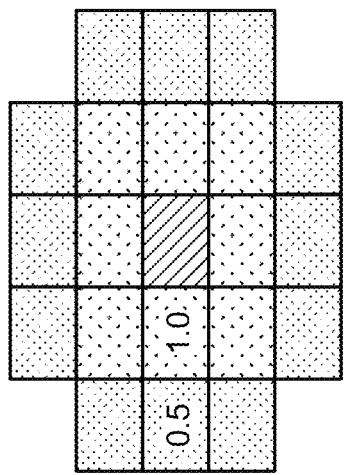
Figure 11G:
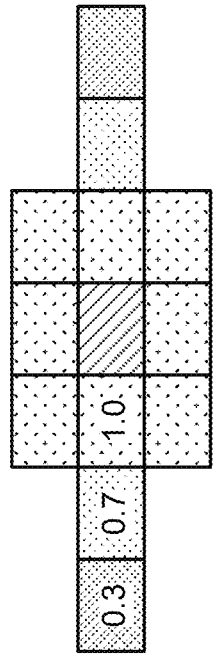
Figure 11A:
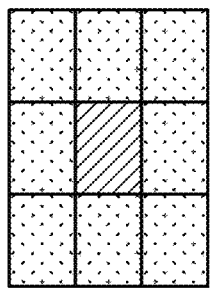
Figure 11B:
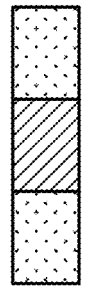
Figure 11C:

In this situation, among the examples illustrated in FIGS. 11A to 11G, the pixel groupings in FIGS. 11A to 11C are sufficient for correcting ringing in general; however, to improve the level of precision, the pixel groupings illustrated in FIGS. 11D to 11G may be used.

For example, as illustrated in FIG. 11A, with respect to a target pixel (the center pixel in FIG. 11A) of which a shift amount is to be determined, the ringing correcting function 152 sets a pixel group S made up of eight pixels including the two adjacent pixels positioned on either side of the target pixel in terms of the X direction (in the left-and-right direction in FIG. 11A) and the six adjacent pixels positioned on either side of the two pixels and the target pixel in terms of the Y direction (in the up-and-down direction in FIG. 11A).

Further, while Ns denotes the number of pixels of which the shift amounts have been determined among the pixels included in the group S, the ringing correcting function 152 is configured to set a shift amount tolerance range for the target pixel in accordance with the value of Ns.

For example, when Ns=0 is true, the ringing correcting function 152 is configured to set the shift amount tolerance range for the target pixel to be the range from the minimum value to the maximum value of the shift amounts used in the ringing correction described above.

As a result, when the shift amounts used in the ringing correction range from −0.5 pixels to +0.5 pixels, for example, the shift amount tolerance range for the target pixel is calculated to be the range from −0.5 pixel to +0.5 pixel, if Ns=0 is true.

Further, when Ns>0 is true, the ringing correcting function 152 is configured to set the shift amount tolerance range for the target pixel to be a range from ARlow to ARhigh, by calculating the lower limit value ARlow and the upper limit value ARhigh according to Expressions (2) to (7) presented below where min(S) denotes the minimum value and max(S) denotes the maximum value among the shift amounts of pixels which are included in the group S and for which the shift amounts have already been determined.

$$Rs = Ns/8 \quad (2)$$

$$T1 = h \times Rs \times [\max(S) - \min(S)] \quad (3)$$

$$T2\text{low} = [-0.5 + \min(S)]/Ns \quad (4)$$

$$T2\text{high} = [+0.5 - \max(S)]/Ns \quad (5)$$

$$AR\text{low} = \min(S) + T1 - T2\text{low} \quad (6)$$

$$AR\text{high} = \max(S) - T1 + T2\text{high} \quad (7)$$

The coefficient h can be reasonably set to a constant value of ½, or h may be further optimized while observing the effect of its value on ringing correction quality, and on sub-voxel shift continuity which affects image sharpness.

Accordingly, when the shift amounts used in the ringing correction range from −0.5 pixels to +0.5 pixels, for example, and if Ns=1 when a certain pixel is processed, then Rs is ⅛, and the shift amount tolerance range for that pixel is calculated to be the range from approximately −0.5 pixels to approximately +0.5 pixels.

As another example, if Ns=8 when a certain other pixel is processed, then Rs is 1, and the shift amount tolerance range for that pixel is calculated as the range from "min(S)+h×[max(S)−min(S)] pixels" to "max(S)−h×[max(S)−min(S)] pixels".

Figure 11D:

Alternatively, for example, as illustrated in FIG. 11B, with respect to the target pixel, the ringing correcting function 152 may set a group S including the two adjacent pixels positioned on either side of the target pixel in terms of the X direction. As another example, as illustrated in FIG. 11C, with respect to the target pixel, the ringing correcting function 152 may set a group S made up of four pixels including the two adjacent pixels positioned on either side of the target pixel in terms of the X direction; and the two adjacent pixels positioned on either side of the two pixels in terms of the X direction. As yet another example, as illustrated in FIG. 11D, with respect to the target pixel, the ringing correcting function 152 may set a group S made up of six pixels including the two adjacent pixels positioned on either side of the target pixel in terms of the X direction; the two adjacent pixels positioned on the outside of the two abovementioned adjacent pixels in terms of the X direction; and the two adjacent pixels positioned further on the outside of the two abovementioned adjacent pixels in terms of the X direction.

As yet another example, as illustrated in FIG. 11F, with respect to the target pixel, the ringing correcting function 152 may set a group S made up of 20 pixels further including, in addition to the four pixels included in the group S in the example in FIG. 11C, the ten adjacent pixels positioned on either side of the four pixels and the target pixel in terms of the Y direction; and the six adjacent pixels positioned on the outside, in terms of the Y direction, of the six inner pixels among the ten pixels in terms of the X direction. As yet another example, as illustrated in FIG. 11G, with respect to the target pixel, the ringing correcting function 152 may set a group S made up of twelve pixels further including, in addition to the six pixels included in the group S in the example in FIG. 11D, the six adjacent pixels positioned on either side, in terms of the Y direction, of the target pixel and the two inner pixels among the six pixels in terms of the X direction.

Further, when setting the shift amount tolerance range by using the method described above, the ringing correcting function 152 may apply weights to the shift amounts of the pixels included in the group S.

For example, as illustrated in FIGS. 11E to 11G, with respect to the pixels included in the group S, the ringing correcting function 152 may apply weights in such a manner that the farther a pixel is positioned from the target pixel, the smaller weight is applied to the shift amount thereof. For example, as illustrated in FIGS. 11E and 11F, the ringing correcting function 152 applies a weight 1.0 to the shift amount of each of the pixels positioned closest to the target pixel, applies a weight 0.7 to the shift amount of each of the second closest pixels, and applies a weight 0.3 to the shift amount of each of the third closest pixels. Alternatively, as illustrated in FIG. 11G, the ringing correcting function 152 may vary, between the X direction and the Y direction, the magnitudes of the weights corresponding to the distances from the target pixel.

Further, with respect to the pixels of which the local amplitude of ringing artifacts are equal to or higher than the first threshold value, the ringing correcting function 152 is configured, with respect to each of the pixels, to determine the shift amount from the position of the pixel to the position where the ringing artifacts will be reduced, by using shift amounts within the set tolerance range.

In this situation, in the process described above, the shift amount tolerance range set by the ringing correcting function 152 changes in accordance with the quantity Ns of the pixels of which the shift amounts have already been determined. The smaller the value of Ns is, the larger is the range. The larger the value of Ns is, the smaller is the range.

In addition, in the process described above for a particular pixel, the higher the local amplitude of ringing artifacts, the earlier the shift amount thereof is determined, and therefore, the smaller is the value of Ns. On the contrary, the lower the local amplitude of ringing artifacts, the later the shift amount thereof is determined, and therefore, the larger is the value of Ns.

Consequently, in the process described above for a particular pixel, the higher the local amplitude of ringing artifacts, the larger is the range of possible shift amounts within which the pixel's shift amount is determined. On the contrary, the lower the local amplitude of ringing artifacts, the smaller is the range of possible shift amounts within which the pixel's shift amount is determined.

As a result, the shift amount of each pixel is determined in such a manner that the pixels with the highest local amplitudes of ringing artifacts are granted the most freedom in obtaining shift values that are optimal for reducing ringing artifacts in those pixels, while pixels with lower local amplitudes of ringing artifacts are granted less freedom. In addition, regardless of the local amplitude of ringing artifacts, the shift amount for each pixel is determined such that differences from the shift amounts of adjacently positioned pixels are minimized. That is, the shift amount is determined so as to be approximately continuous with the shift amounts of adjacently positioned pixels.

With respect to pixels for which the local amplitude of ringing artifacts is equal to or higher than the first threshold value, the shift amount of the pixel is determined according to the above process only.

Further, with respect to each pixel for which the local amplitude of ringing artifacts is lower than the first threshold value but is equal to or higher than the second threshold value, the ringing correcting function 152 is configured, with respect to each of the pixels, to determine the shift amount within a tolerance range computed in the same manner as for pixels which have a local amplitude equal to or higher than the first threshold value, and to subsequently multiply the determined shift amount by an adjustment coefficient. In this situation, the ringing correcting function 152 is configured to gradually diminish the values of the adjustment coefficients from 1 to 0, sequentially in descending order starting with pixels having a higher local amplitude of ringing artifacts.

Further, with respect to each of the pixels of which the local amplitude of ringing artifacts is lower than the second threshold value, the ringing correcting function 152 is configured to set the shift amount to 0 for each of the pixels.

As a result, also with respect to each of the pixels for which the local amplitude of ringing artifacts is lower than the first threshold value, the shift amount of the pixel is determined so as to be approximately continuous with the shift amounts of adjacently positioned pixels.

Further, similarly to the X direction, the ringing correcting function 152 is configured, regarding the Y direction also, to generate the Y-direction ringing-corrected image in which the ringing artifacts along the Y direction have been corrected, by performing the ringing correction on the Y-direction ringing image, in the same manner as performed for the X direction (FIG. 2, (E)).

Further, the ringing correcting function 152 is configured to generate the final image in which ringing artifacts along the X direction and the Y direction have been corrected, by adding together the X-direction ringing-corrected image and the Y-direction ringing-corrected image that were generated (FIG. 2, (F)).

In this situation, the final image generated according to the process described above is obtained by implementing a ringing correcting method that employs sub-voxel shifts, and further, with respect to the MR image to be processed, determining a shift amount for each pixel so as to be approximately continuous with the shift amounts of adjacently positioned pixels. The final image therefore is an image in which ringing artifacts have been corrected and which is less blurred than a ringing-corrected image that was generated according to the original sub-voxel shift method.

For example, as explained above, if the shift amount of each pixel was determined from among the full range of shift amounts used in the ringing correction, the continuity between adjacently positioned pixels would be ignored, and as a result, the image would be blurred.

In contrast, according to the present embodiment as explained above, the shift amount of each pixel is determined so as to be approximately continuous with the shift amounts of adjacently positioned pixels. In this situation, the shift amount can be regarded as a function of two variables, the pixel coordinates X and Y, that is sampled at the location of each pixel in the image. The present embodiment manages the determination of the shift amount at each pixel such that if the shift amount function were to be examined throughout the whole image, it would be smooth and would contain no spikes or sharp folds. In other words, it is a continuous function of the pixel coordinates X and Y.

FIGS. 12A to 13B are drawings illustrating examples of the shift amount determining process performed by the ringing correcting function 152 according to the first embodiment.

Figure 12B:
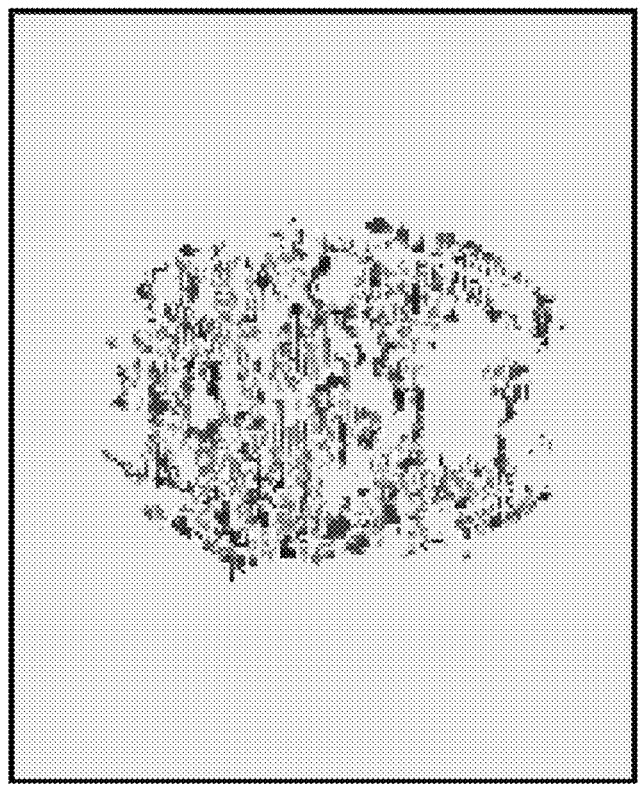
FIGS. 12A and 12B are drawings illustrating examples of, respectively, first-pass (initial) and second-pass (final) shift amount determination processes along an image x axis, performed by the ringing correcting function according to the first embodiment.
Figure 12A:
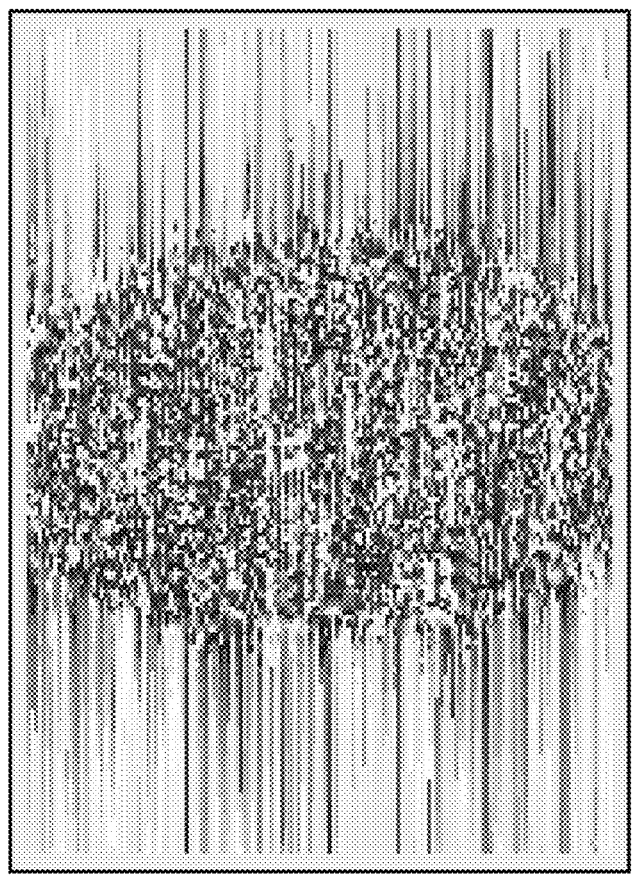

More specifically, FIGS. 12A to 13B illustrate shift maps obtained by mapping the shift amounts determined for each of the pixels. FIGS. 12A and 12B illustrate shift maps in the X direction, whereas FIGS. 13A and 13B illustrate shift maps in the Y direction. Further, FIGS. 12A and 13A illustrate shift maps obtained when the shift amount of each of the pixels is determined from among all the shift amounts used in the ringing correction, whereas FIGS. 12B and 13B illustrate shift maps obtained when the shift amount of each of the pixels is determined by using the shift amounts within the tolerance range described above.

For example, as illustrated in FIGS. 12A and 13A, when the shift amounts are determined from among the full range of shift amounts used in the ringing correction, the shift amount of each pixel is determined independently, and continuity with adjacently positioned pixels is ignored. As a result, although ringing artifacts are corrected, the final corrected image becomes blurred throughout the image.

In contrast, as illustrated in FIGS. 12B and 13B, when the shift amount of each of the pixels is determined by using the shift amounts within the tolerance range described above, the shift amount of each of the pixels is determined so as to be approximately continuous with the shift amounts of adjacently positioned pixels, and in addition, the shift amount determination is limited to pixels that have a non-trivial local amplitude of ringing artifacts. As a result, the final image to be generated is an image in which ringing artifacts have been corrected and which is less blurred than an image processed by a conventional method for countering ringing artifacts.

In this situation, the final image generated by the ringing correcting function 152 is displayed by the display 140 according to an instruction from the operator, for example. Further, the final image generated by the ringing correcting function 152 may be transmitted to the MRI apparatus 200 or the image storing apparatus 300 so as to be displayed or stored therein, according to an instruction from the operator, for example.

The processing functions of the processing circuitry 150 have thus been explained. For example, the processing circuitry 150 described above may be realized by using one or more processors. In that situation, the processing functions of the processing circuitry 150 may be stored in the storage 120 in the form of computer-executable programs, for example. Further, the processing circuitry 150 is configured to realize the processing functions corresponding to the programs, by reading and executing the programs stored in the storage 120. In other words, the processing circuitry 150 that has read the programs has the processing functions illustrated in FIG. 1.

For example, the processes described above as being performed by the MR image acquiring function 151 are realized as a result of the processing circuitry 150 reading and executing a program corresponding to the MR image acquiring function 151 from the storage 120. Also, the processes described above as being performed by the ringing correcting function 152 are realized as a result of the processing circuitry 150 reading and executing a program corresponding to the ringing correcting function 152 from the storage 120.

As explained above, in the image processing apparatus 100 according to the first embodiment, the ringing correcting function 152 is configured, with respect to each of the pixels included in the MR image to be processed, to determine the shift amount from the position of the pixel to the position where ringing artifacts will be reduced and to perform the ringing correction to correct ringing artifacts occurring in the MR image on the basis of the determined shift amounts. In this situation, the ringing correcting function 152 is configured, with respect to each of the pixels included in the MR image to be processed, to estimate the local amplitude of ringing artifacts and to perform the ringing correction on the MR image to be processed, while determining the shift amount of each of the pixels so as to be approximately continuous with the shift amounts of adjacently positioned pixels, sequentially in descending order starting with the pixels having a higher local amplitude, on the basis of the result of estimating the local amplitudes of ringing artifacts.

Consequently, the image processing apparatus 100 according to the first embodiment is able to provide an MR image in which ringing artifacts have been corrected and which is less blurred than an image generated from the same data according to the original sub-voxel shift method.

FIGS. 14A to 18B are drawings illustrating advantageous effects of the image processing apparatus 100 according to the first embodiment.

More specifically, FIGS. 14A and 15A are drawings illustrating an MR image (both drawings are the same image) such as those that may be input to the image processing apparatus 100 according to the first embodiment.

FIGS. 14B and 15B illustrate results of performing different ringing corrections on the same MR image, the image of a brain illustrated in FIGS. 14A and 15A. FIG. 14B illustrates the image obtained when a spatial smoothing process that employs a low-pass filter is used to reduce ringing. FIG. 15B illustrates the image obtained by performing the ringing correction described in the present embodiment.

For example, as illustrated in FIG. 14B, when the smoothing process that employs a low-pass filter is used, and when the filter is adjusted such that it induces a minimal amount of blur, ringing artifacts are not sufficiently suppressed (see the sections indicated by arrows in the drawing).

In contrast, as illustrated in FIG. 15B for example, when the ringing correction described in the present embodiment is performed, it is possible to suppress the ringing artifacts more completely, while the level of blur is similar to that of the example in FIG. 14B (compare the sections indicated by arrows in both drawings).

Figure 16:
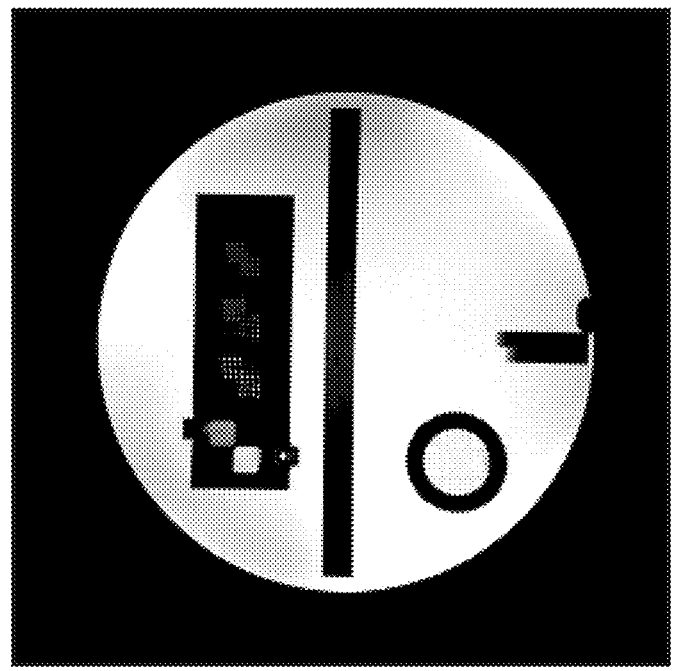
FIG. 16 is a drawing illustrating another example of an input to the image processing apparatus according to the first embodiment.
Figure 17B:
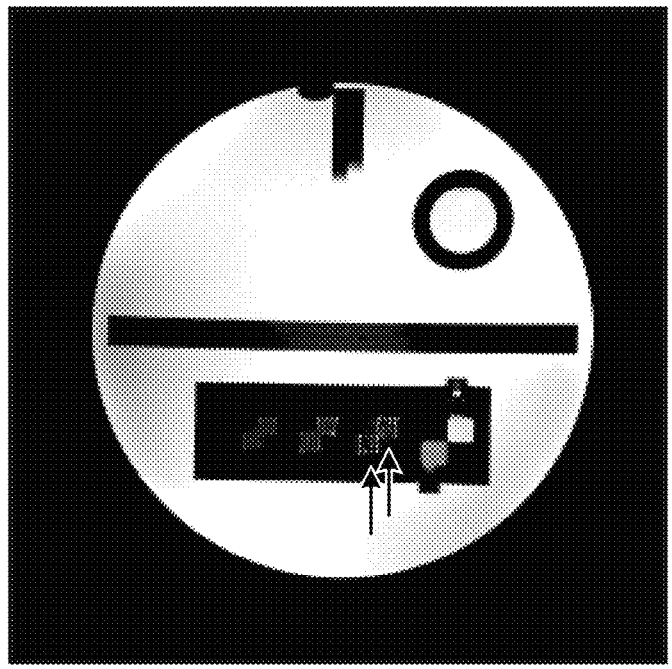
FIGS. 17A and 17B are drawings illustrating an intermediate stage within the ringing correcting function according to the first embodiment.
Figure 17A:
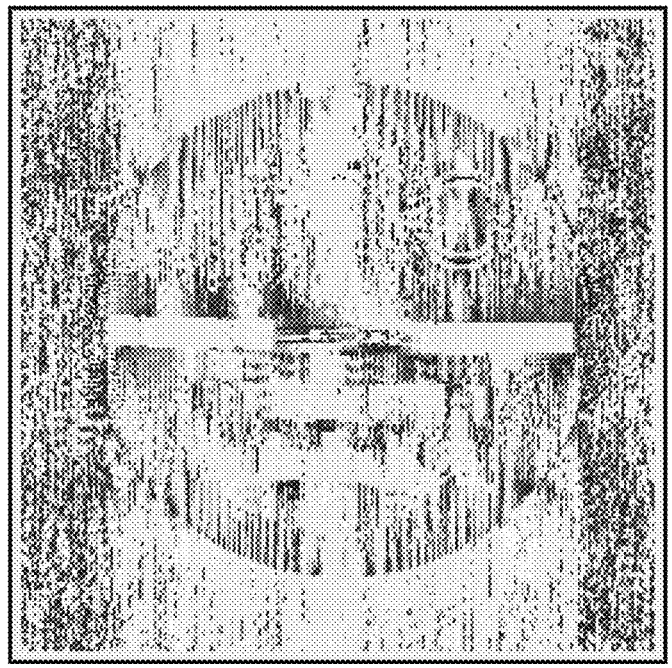
Figure 18B:
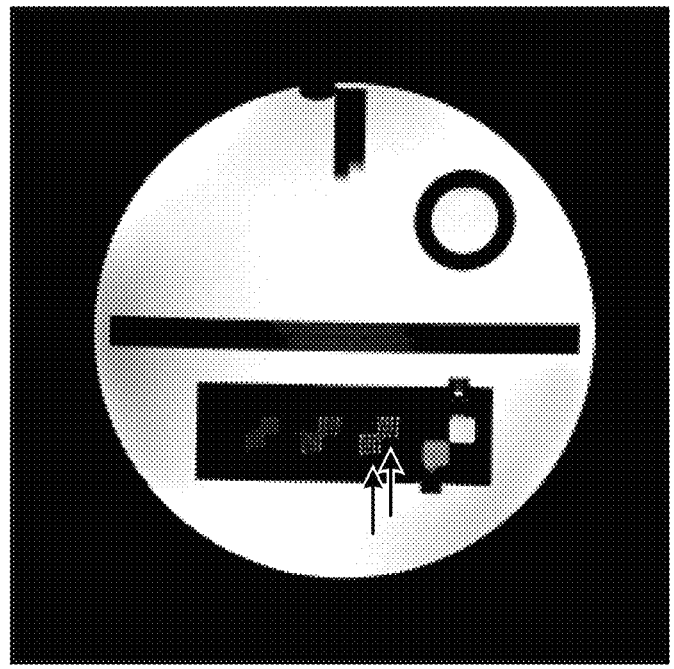
FIGS. 18A and 18B are other drawings illustrating advantageous effects of the image processing apparatus according to the first embodiment.
Figure 18A:
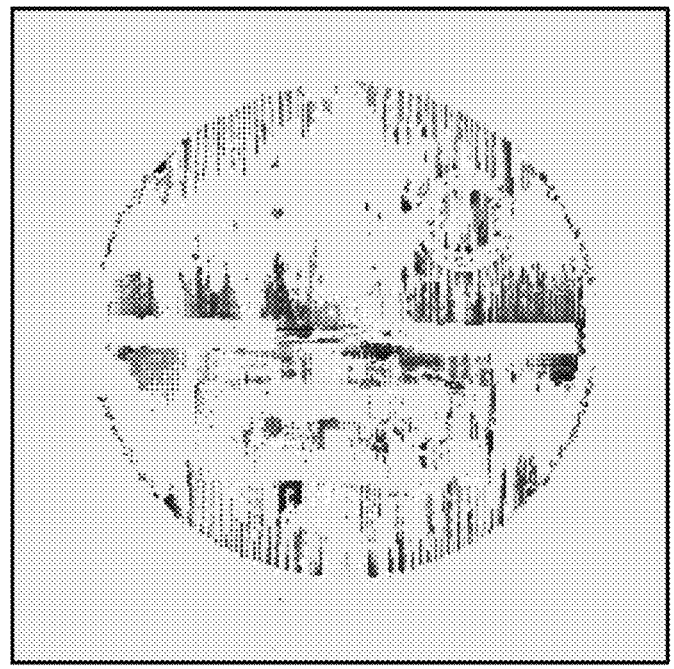

Further, FIG. 16 illustrates an MR image taken of a phantom. FIGS. 17A and 17B illustrate results of performing a ringing correction on the MR image in FIG. 16, by using the ringing correcting method that employs sub-voxel shifts, without taking into account the continuity of shift amount between adjacently positioned pixels. FIGS. 18A and 18B illustrate results of performing the ringing correction described in the present embodiment on the MR image in FIG. 16. FIGS. 17A and 18A illustrate shift maps obtained by mapping the shift amounts determined in the respective ringing corrections. FIGS. 17B and 18B illustrate final images obtained from the respective ringing corrections.

For example, as illustrated in FIG. 17A, when the ringing correction is performed by using the ringing correcting method that employs sub-voxels shifts without taking into account the continuity of shift amount between adjacently positioned pixels, a shift amount is determined for each and every pixel in the image, and the shift amount of each of the pixels is determined while ignoring the continuity between adjacently positioned pixels. As a result, as illustrated in FIG. 17B in the generated final image, although ringing artifacts have been corrected, the image is blurred throughout the image (see the sections indicated by the arrows in the image).

In contrast, for example, as illustrated in FIG. 18A, when the ringing correction described in the present embodiment is performed, the shift amount of each of the pixels is determined so as to be approximately continuous with the shift amounts of adjacently positioned pixels. As a result, as illustrated in FIG. 18B, the generated final image is an image in which ringing artifacts have been corrected and which is less blurred than an image processed by a conventional method for countering ringing artifacts (see the sections indicated by the arrows in the drawing). Further, because the local amplitude of ringing artifacts is considered for each pixel, the shift amount determination can be limited to pixels that have a non-trivial local amplitude of ringing artifacts, while for all other pixels having a trivial local amplitude, the shift amount can be set to zero. It is therefore possible to reduce the number of computations and shorten the processing time.

Generally speaking, the ringing correcting method that employs sub-voxel shifts is frequently employed in studies of the brain. In this field, result images and statistics are often calculated based on pixel values in MR images. For this reason, it is considered to be advantageous to use a ringing correcting method that, as described in the present embodiment, yields an MR image in which ringing artifacts are corrected and which is less blurred than an image generated from the same data according to the original sub-voxel shift method.

Further, in the first embodiment described above, the ringing correcting function 152 is configured to estimate the local amplitudes of ringing artifacts once, and to perform the ringing correction once thereafter based on the estimated local amplitudes; however, possible embodiments are not limited to this example. For instance, the ringing correcting function 152 may be configured to improve the accuracy of the estimated local amplitudes and the quality of the ringing correction by re-estimating the local amplitudes of ringing artifacts multiple times in an iterative fashion and then performing the final ringing correction. As another example, the ringing correcting function 152 may be configured to iteratively repeat the cycle of estimating local amplitudes of ringing artifacts, performing a ringing correction based on the estimates, and using the results to improve the estimates and the ringing correction performed in the next cycle.

As a result, it is possible to improve the level of precision in estimating the local amplitudes of ringing artifacts and to provide an MR image in which ringing artifacts have been corrected with a higher level of precision, and which is less blurred than an MR image processed by a conventional method for countering ringing artifacts.

Further, in the first embodiment described above, the example was explained in which the MR image to be processed is a two-dimensional MR image defined with an X direction (the readout direction) and a Y direction (the phase encoding direction) that are orthogonal to each other; however, possible embodiments are not limited to this example.

For instance, an MRI apparatus is typically configured to scan a stack of two-dimensional MR images to enable the examination of a three-dimensional volume within a subject. In such cases, the embodiment described above may be applied likewise to each slice in the stack of slices.

Further, in cases where the MR sequence Fourier-encodes all three dimensions, by performing a ringing correction process regarding the Z direction (the slice-encoding direction) similarly to those performed for the X direction and the Y direction, it is possible to similarly apply the embodiment described above to situations where the MR image to be processed is a three-dimensional MR image.

Still further, in the first embodiment described above, the example was explained in which the acquiring unit and the correcting unit of the present disclosure are realized by the MR image acquiring function and the ringing correcting function of the processing circuitry, respectively; however, possible embodiments are not limited to this example. For instance, instead of being realized by the MR image acquiring function and the ringing correcting function described in the embodiment, the acquiring unit and the correcting unit of the present disclosure may be realized by hardware alone, software alone, or a combination of hardware and software.

Second Embodiment

Certain embodiments of the image processing apparatus have thus been explained. However, possible embodiments of the techniques disclosed in the present disclosure are not limited to the above examples. For instance, the techniques disclosed in the present disclosure may be applied to an MRI apparatus. Thus, in the following sections, an example in which the techniques disclosed in the present disclosure are applied to an MRI apparatus will be explained as a second embodiment.

FIG. 19 is a diagram illustrating an exemplary configuration of the MRI apparatus according to the second embodiment.

For example, as illustrated in FIG. 19, an MRI apparatus 200 includes a static magnetic field magnet 1, a gradient coil 2, a gradient power source 3, a whole-body RF coil 4, a local RF coil 5, a transmitter circuitry 6, a receiver circuitry 7, an RF shield 8, a gantry 9, a couch 10, an input interface 11, a display 12, a storage 13, and processing circuitry 14 to 17.

The static magnetic field magnet 1 is configured to generate a static magnetic field in an imaging space in which a subject S is placed. More specifically, the static magnetic field magnet 1 is formed to have a hollow and substantially circular cylindrical shape (which may have an oval cross-section orthogonal to the central axis thereof) and is configured to generate the static magnetic field in the imaging space formed on the inner circumferential side thereof. For example, the static magnetic field magnet 1 may be a superconductive magnet, a permanent magnet, or the like. In the present example, the superconductive magnet may be structured by using, for instance, a container filled with a cooling agent such as liquid helium and a superconductive coil immersed in the container.

The gradient coil 2 is arranged on the inside of the static magnetic field magnet 1 and is configured to generate gradient magnetic fields in the imaging space in which the subject S is placed. More specifically, the gradient coil 2 is formed to have a hollow and substantially circular cylindrical shape (which may have an oval cross-section orthogonal to the central axis thereof) and includes an X coil, a Y coil, and a Z coil respectively corresponding to an X-axis, a Y-axis, and a Z-axis that are orthogonal to one another. The X coil, the Y coil, and the Z coil are configured to generate, in the imaging space, the gradient magnetic fields that linearly change along the respective axial directions, on the basis of electric currents supplied thereto from the gradient power source 3. In this situation, the Z-axis is set along a magnetic flux in the static magnetic field generated by the static magnetic field magnet 1. Further, the X-axis is set along a horizontal direction orthogonal to the Z-axis. The Y-axis is set along a vertical direction orthogonal to the Z-axis. In this situation, the X-axis, the Y-axis, and the Z-axis structure an apparatus coordinate system unique to the MRI apparatus 200. In general, these X, Y, and Z axes do not correspond to the X (readout) axis, the Y (phase encoding) axis, and the Z (slice) axis that were referred to in explanations of other embodiments above, though the operator could choose them such that they correspond.

By supplying electric currents to the respective axis coils within the gradient coil 2, the gradient power source 3 is configured to cause the gradient magnetic fields to be generated. More specifically, by individually supplying the electric current to each of the X, Y, and Z coils in the gradient coil 2, the gradient power source 3 is configured to cause magnetic field gradients to be generated, so as to linearly change along the readout direction, the phase encoding direction, and the slice direction, respectively, that are orthogonal to one another. In this situation, the axis extending along the readout direction, the axis extending along the phase encoding direction, and the axis extending along the slice direction structure a logical coordinate system used for defining slice regions or a volume region subject to the imaging.

More specifically, as each being superimposed on the static magnetic field generated by the static magnetic field magnet 1, the magnetic field gradients generated along the readout direction, the phase encoding direction, and the slice direction append spatial position information to NMR signals emitted from the subject S. More specifically, the gradient magnetic field along the readout direction imparts position information along the readout direction to the NMR signal, by changing the frequency of the NMR signal in accordance with positions in the readout direction. Further, the gradient magnetic field along the phase encoding direction imparts position information along the phase encoding direction to the NMR signal, by changing the phase of the NMR signal in accordance with positions in the phase encoding direction. In addition, when two-dimensional MR images (slice images) are to be taken, the gradient magnetic field along the slice direction determines the positions, the thicknesses, and the number of slices to be imaged, by changing the frequency of the NMR signal in accordance with positions in the slice direction. Further, when a three-dimensional MR image (a volume image) is to be taken, the gradient magnetic field along the slice direction imparts position information along the slice direction to the NMR signal, by changing the phase of the NMR signal in accordance with positions in the slice direction.

The whole-body RF coil 4 is arranged on the inner circumferential side of the gradient coil 2 and is configured to apply an RF pulse (an excitation pulse or the like) to the subject S placed in the imaging space and to receive the NMR signal (an echo signal or the like) emitted from the subject S due to the influence of the RF pulse. More specifically, the whole-body RF coil 4 is formed to have a hollow and substantially circular cylindrical shape (which may have an oval cross-section orthogonal to the central axis thereof) and is configured to apply the RF pulse to the subject S placed in the imaging space positioned on the inner circumferential side thereof, on the basis of an RF pulse signal supplied thereto from the transmitter circuitry 6. Further, the whole-body RF coil 4 is configured to receive the NMR signal emitted from the subject S due to the influence of the RF pulse and to output the received NMR signal to the receiver circuitry 7. For example, the whole-body RF coil 4 may be a birdcage coil or a Transverse Electromagnetic (TEM) coil.

The local RF coil 5 is arranged in the vicinity of the subject S at the time of imaging and is configured to receive the NMR signal emitted from the subject S. More specifically, a local RF coil 5 may be prepared for each anatomical region of the subject S. At the time of imaging the subject S, the local RF coil 5 is arranged in the vicinity of the site to be imaged and is configured to receive the NMR signal emitted from the subject S due to the influence of the RF pulse applied by the whole-body RF coil 4 and to output the received NMR signal to the receiver circuitry 7. For example, the local RF coil 5 may be a surface coil or a phased array coil structured by combining together a plurality of surface coils as coil elements. In addition, the local RF coil 5 may further have a transmitting function to apply an RF pulse to the subject.

The transmitter circuitry 6 is configured to output the RF pulse signal corresponding to a resonance frequency (a Larmor frequency) unique to targeted atomic nuclei placed in the static magnetic field, to the whole-body RF coil 4 or the local RF coil 5. More specifically, the transmitter circuitry 6 includes a pulse generator, an RF generator, a modulator, and an amplifier. The pulse generator is configured to generate a waveform of the RF pulse signal. The RF generator is configured to generate an RF signal having the resonance frequency. The modulator is configured to generate the RF pulse signal by modulating the amplitude of the RF signal generated by the RF generator, with the waveform generated by the pulse generator. The amplifier is configured to amplify the RF pulse signal generated by the modulator and to output the amplified signal to the whole-body RF coil 4 or the local RF coil 5.

The receiver circuitry 7 is configured to generate the NMR data on the basis of the NMR signal received from the whole-body RF coil 4 or the local RF coil 5 and to output the generated NMR data to the processing circuitry 15. More specifically, the receiver circuitry 7 includes a selector, a pre-amplifier, a phase detector, and an analog/digital (A/D) converter. The selector is configured to selectively receive an input of the NMR signal from the whole-body RF coil 4 or the local RF coil 5. The pre-amplifier is configured to amplify the NMR signal received from the selector. The phase detector is configured to detect the phase of the NMR signal received from the pre-amplifier. The A/D converter is configured to generate the NMR data by converting an analog signal received from the phase detector into a digital signal and to output the generated NMR data to the processing circuitry 15. In this situation, the processes described as being performed by the receiver circuitry 7 do not all necessarily have to be performed by the receiver circuitry 7. One or more of the processes (e.g., the process performed by the A/D converter) may be performed by the whole-body RF coil 4 or the local RF coil 5.

The RF shield 8 is arranged between the gradient coil 2 and the whole-body RF coil 4 and is configured to shield the gradient coil 2 from the RF pulse generated by the whole-body RF coil 4. More specifically, the RF shield 8 is formed to have a hollow and substantially circular cylindrical shape (which may have an oval cross-section orthogonal to the central axis thereof) and is arranged in the space on the inner circumferential side of the gradient coil 2 so as to cover the outer circumferential surface of the whole-body RF coil 4.

The gantry 9 has a hollow bore 9a formed to have a substantially circular cylindrical shape (which may have an oval cross-section orthogonal to the central axis thereof) and houses therein the static magnetic field magnet 1, the gradient coil 2, the whole-body RF coil 4, and the RF shield 8. More specifically, the gantry 9 houses these elements therein, while the whole-body RF coil 4 is arranged on the outer circumferential side of the bore 9a; the RF shield 8 is arranged on the outer circumferential side of the whole-body RF coil 4; the gradient coil 2 is arranged on the outer circumferential side of the RF shield 8; and the static magnetic field magnet 1 is arranged on the outer circumferential side of the gradient coil 2. In this situation, the space inside the bore 9a included in the gantry 9 serves as the imaging space in which the subject S is placed at the time of the imaging.

The couch 10 includes a couchtop 10a on which the subject S is placed. At the time of imaging the subject S, the couchtop 10a on which the subject S is placed is moved into the imaging space. For example, the couch 10 is installed in such a manner that the longitudinal direction of the couchtop 10a extends parallel to the central axis of the static magnetic field magnet 1.

In the present example, the MRI apparatus 200 has a so-called tunnel-like structure in which the static magnetic field magnet 1, the gradient coil 2, and the whole-body RF coil 4 are each formed to have the substantially circular cylindrical shape; however, possible embodiments are not limited to this example. For instance, the MRI apparatus 200 may have a so-called open structure in which a pair of static magnetic field magnets, a pair of gradient coils, and a pair of RF coils are arranged so as to oppose each other, while the imaging space in which the subject S is placed is interposed therebetween. In the open structure, the space interposed between the pair of static magnetic field magnets, the pair of gradient coils, and the pair of RF coils corresponds to the bore in the tunnel-like structure.

The input interface 11 is configured to receive operations that convey various types of instructions and various types of information from the operator. More specifically, the input interface 11 is connected to the processing circuitry 17 and is configured to convert the input operations received from the operator into electrical signals and to output the electrical signals to the processing circuitry 17. For example, the input interface 11 is realized by using a trackball, a switch button, a mouse, a keyboard, a touchpad on which an input operation can be performed by touching an operation surface thereof, a touch screen in which a display screen and a touchpad are integrally formed, contactless input circuitry using an optical sensor, audio input circuitry, and/or the like that are used for setting image acquisition conditions, a Region Of Interest (ROI), and the like. In the present disclosure, the input interface 11 does not necessarily have to include one or more physical operational component parts such as a mouse, a keyboard, and/or the like. Examples of the input interface 11 include, for instance, electrical signal processing circuitry configured to receive an electrical signal corresponding to an input operation from an external input machine provided separately from the apparatus and to output the electrical signal to controlling circuitry.

The display 12 is configured to display various types of information. More specifically, the display 12 is connected to the processing circuitry 17 and is configured to convert data of various types of information sent thereto from the processing circuitry 17 into display-purpose electrical signals and to output the electrical signals. For example, the display 12 is realized by using a liquid crystal monitor, a Cathode Ray Tube (CRT) monitor, a touch panel, or the like.

The storage 13 is configured to store various types of data therein. More specifically, the storage 13 is connected to the processing circuitry 14 to 17 and is configured to store therein various types of data input and output by the processing circuitry. For example, the storage 13 is realized by using a semiconductor memory element such as a Random Access Memory (RAM) or a flash memory, or a hard disk, an optical disk, or the like.

The processing circuitry 14 includes a couch controlling function 14a. The couch controlling function 14a is configured to control operations of the couch 10 by outputting control-purpose electrical signals to the couch 10. For example, via the input interface 11, the couch controlling function 14a is configured to receive, from the operator, an instruction to move the couchtop 10a in a longitudinal direction, an up-and-down direction, or a left-and-right direction and to bring a moving mechanism of the couchtop 10a included in the couch 10 into operation, so as to move the couchtop 10a according to the received instruction.

The processing circuitry 15 includes an acquiring function 15a. The acquiring function 15a is configured to acquire k-space data of the subject S on the basis of an imaging sequence output from the processing circuitry 17. More specifically, the acquiring function 15a is configured to acquire the NMR data by driving the gradient power source 3, the transmitter circuitry 6, the receiver circuitry 7, and the whole-body RF coil 4 or local RF coil 5, according to any of various types of imaging sequences output from the processing circuitry 17. In this situation, each of the imaging sequences is information that defines: the timing with which the electric current is to be supplied by the gradient power source 3 to the gradient coil 2 and the intensity of the electric current to be supplied; the timing with which the RF pulse signal is to be supplied by the transmitter circuitry 6 to the whole-body RF coil 4 or local RF coil 5, and the intensity of the RF pulse signal to be supplied; the timing with which the NMR signal is sampled by the receiver circuitry 7; and the like. Further, the acquiring function 15a is configured to store the NMR data output by the receiver circuitry 7 into the storage 13. In this situation, the NMR data stored in the storage 13 is stored as k-space data expressing a two- or three-dimensional k-space, as a result of having appended thereto the position information along the directions of the readout direction, the phase encoding direction, and the slice direction, by the gradient magnetic fields explained above.

The processing circuitry 16 includes an MR image generating function 16a. The MR image generating function 16a is configured to generate an MR image from the k-space data of the subject S acquired by the acquiring function 15a of the processing circuitry 15. More specifically, the MR image generating function 16a is configured to generate a two- or three-dimensional MR image by reading the k-space data acquired by the acquiring function 15a of the processing circuitry 15 from the storage 13 and performing a reconstruction process such as a Fourier transform on the read k-space data. After that, the MR image generating function 16a is configured to store the generated MR image into the storage 13. In this situation, the MR image generating function 16a is an example of the generating unit.

The processing circuitry 17 includes an imaging controlling function 17a. The imaging controlling function 17a is configured to receive an input of the image acquisition conditions from the operator via the input interface 11 and to generate the imaging sequence used for acquiring the k-space data of the subject S on the basis of the input image acquisition conditions. Further, by outputting the generated imaging sequence to the processing circuitry 15, the imaging controlling function 17a is configured to cause the acquiring function 15a to acquire the k-space data. In addition, by controlling the processing circuitry 16, the imaging controlling function 17a is configured to have the MR image generated from the k-space data acquired by the acquiring function 15a. Furthermore, the imaging controlling function 17a is configured to read any of the MR images stored in the storage 13 in response to a request from the operator and to cause the display 12 to display the read MR image.

The MRI apparatus 200 according to the present embodiment structured as described above has a function for correcting ringing artifacts in the MR image.

Further, the MRI apparatus 200 according to the present embodiment is configured to be able to provide the MR image in which ringing artifacts have been corrected and which is less blurred than an MR image processed by a conventional method for countering ringing artifacts.

More specifically, the processing circuitry 17 includes a ringing correcting function 17b. In this situation, the ringing correcting function 17b is an example of the correcting unit.

By using the MR image generated by the MR image generating function 16a, the ringing correcting function 17b is configured, similarly to the ringing correcting function 152 described in the first embodiment, to determine, with respect to each of the pixels included in the MR image, a shift amount from the position of the pixel to a position where the ringing artifacts will be reduced and configured to perform the ringing correction to correct the ringing artifacts occurring in the MR image on the basis of the determined shift amounts.

More specifically, the ringing correcting function 17b is configured to read the MR image generated by the MR image generating function 16a from the storage 13 and to perform the same process as that performed by the ringing correcting function 152 described in the first embodiment, by using the read MR image.

The processing functions of the processing circuitry 14 to 17 have thus been explained. For example, the pieces of processing circuitry described above may be realized by using one or more processors. In that situation, the processing functions of the pieces of processing circuitry may be stored in the storage 13 in the form of computer-executable programs, for example. Further, the pieces of processing circuitry are configured to realize the processing functions corresponding to the programs, by reading and executing the programs from the storage 13. In other words, the pieces of processing circuitry that have read the programs have the processing functions illustrated in FIG. 19.

As explained above, in the MRI apparatus 200 according to the second embodiment, the ringing correcting function 17b is configured to perform the same process as that performed by the ringing correcting function 152 described in the first embodiment, by using the MR image generated by the MR image generating function 16a.

Consequently, similarly to the image processing apparatus 100 described in the first embodiment, the MRI apparatus 200 according to the second embodiment is capable of providing the MR image in which ringing artifacts have been corrected and which is less blurred than an MR image processed by a conventional method for countering ringing artifacts.

Further, in the second embodiment described above, the example was explained in which the generating unit and the correcting unit of the present disclosure are realized by the MR image generating function and the ringing correcting function of the processing circuitry, respectively; however, possible embodiments are not limited to this example. For instance, instead of being realized by the MR image generating function and the ringing correcting function described in the embodiment, the generating unit and the correcting unit of the present disclosure may be realized by hardware alone, software alone, or a combination of hardware and software.

OTHER EMBODIMENTS

It is also possible to apply the configuration of the image processing apparatus 100, described in the above embodiment, to a system intermediated by a network such as a cloud. In that situation, for example, processing circuitry provided in a server apparatus included in the system has installed therein the same processing functions as the MR image acquiring function and the ringing correcting function described above. Further, a final image generated by the ringing correcting function installed in the processing circuitry of the server apparatus is transmitted to a client apparatus used by a user of the system, so as to be displayed on a display or the like provided for the client apparatus.

Further, in the embodiments described above, the processing circuitry does not necessarily have to be realized by using a single processor and may be structured by combining together a plurality of independent processors, so that the processing functions are realized as a result of the processors executing the programs. Further, the processing functions of the processing circuitry may be realized as being distributed among or integrated into one or more pieces of processing circuitry, as appropriate. Furthermore, in the above embodiments, the example was explained in which the programs corresponding to the processing functions are stored in a single storage; however possible embodiments are not limited to this example. For instance, the programs corresponding to the processing functions may be stored in a distributed manner in a plurality of storages so that the processing circuitry reads and executes the programs from the storages.

The term "processor" used in the above description of the embodiments denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). In this situation, instead of having the programs saved in the storage, it is also acceptable to directly incorporate the programs in the circuitry of one or more processors. In that situation, the one or more processors are configured to realize the functions by reading and executing the programs incorporated in the circuitry thereof. Further, the processors of the present embodiments do not each necessarily have to be structured as a single piece of circuitry. It is also acceptable to structure one processor by combining together a plurality of pieces of independent circuitry so as to realize the function thereof.

In this situation, the programs executed by the one or more processors are provided as being incorporated in advance in a Read-Only Memory (ROM), storage, or the like. The programs may be provided as being recorded on a non-transitory computer-readable storage medium such as a Compact Disk Read-Only Memory (CD-ROM), a Flexible Disk (FD), a Compact Disk Recordable (CD-R), or a Digital Versatile Disk (DVD), in a file that is in an installable or executable format for the apparatuses. Further, the programs may be stored in a computer connected to a network such as the Internet so as to be provided or distributed as being downloaded via the network. For example, the programs are structured as modules including the processing functions described above. In the actual hardware, as a result of a CPU reading and executing the programs from a storage medium such as a ROM, the modules are loaded into a main storage apparatus so as to be generated in the main storage apparatus.

Further, the constituent elements of the apparatuses illustrated in the drawings of the above embodiments are based on functional concepts. Thus, it is not necessarily required to physically configure the constituent elements as indicated in the drawings. In other words, specific modes of distribution and integration of the apparatuses are not limited to those illustrated in the drawings. It is acceptable to functionally or physically distribute or integrate all or a part of the apparatuses in any arbitrary units, depending on various loads and the status of use. Further, all or an arbitrary part of the processing functions performed by the apparatuses may be realized by a CPU and a program analyzed and executed by the CPU or may be realized as hardware using wired logic.

Furthermore, with regard to the processes described in the above embodiments, it is acceptable to manually perform all or a part of the processes described as being performed automatically. Conversely, by using a publicly-known method, it is also acceptable to automatically perform all or a part of the processes described as being performed manually. Further, unless noted otherwise, it is acceptable to arbitrarily modify any of the processing procedures, the controlling procedures, specific names, and various information including various types of data and parameters that are presented in the above text and the drawings.

The various types of data handled in the present disclosure are, typically, digital data.

According to at least one aspect of the embodiments described above, it is possible to provide MR images in which ringing artifacts have been corrected and which are less blurred than an MR image processed by a conventional method for countering ringing artifacts.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the scope of the inventions as defined by the appended claims.

In relation to the embodiments described above, the following notes are presented as a number of aspects of the present disclosure and selected characteristics:

Note 1:
An image processing apparatus, comprising:
an acquiring unit configured to acquire a magnetic resonance image; and
a correcting unit configured to determine, with respect to each of pixels included in the magnetic resonance image, a shift amount from the position of the pixel to a position where ringing artifacts will be reduced and configured to perform a ringing correction to correct the ringing artifacts occurring in the magnetic resonance image on the basis of the determined shift amounts, wherein
the correcting unit is configured to
estimate, with respect to each of the pixels included in the magnetic resonance image, a local amplitude of ringing artifacts, and
perform the ringing correction on the magnetic resonance image, while determining the shift amount of each of the pixels so as to be approximately continuous with the shift amounts of adjacently positioned pixels, sequentially in descending order starting with pixels having a higher local amplitude on the basis of the result of estimating the local amplitudes of ringing artifacts.

The correcting unit may be configured to determine, with respect to each of the set of pixels, an initial shift amount for the respective pixel. The determining the shift amount for each of the pixels may comprise updating the initial shift amount for each pixel to provide the shift amount for that pixel such that the shift amount is continuous with the shift amounts of adjacently-positioned pixels. The updating the initial shift amounts for each pixel to provide the shift amount for that pixel comprises for, for each of at least some of the pixels, setting the shift amount to be closer to the initial shift amounts of that pixel's adjacently-positioned pixels. The updating is performed sequentially for the pixels, starting with the pixels having higher local amplitude.

The initial shift amounts may be determined by a shifting unit of the image processing apparatus obtaining, on the basis of the magnetic resonance image, a plurality of shift images each resulting from shifting the magnetic resonance image by different amounts. The correcting unit may determine the initial shift amount for each pixel by determining the total variation for each pixel value. This comprises, for each of the pixels, determining, for each of the set of different shift amounts associated with the plurality of shift images, the difference in the signal values between the respective pixel and a predetermined number of pixels surrounding the respective pixel once the pixels have been shifted by the respective shift amount. The correcting unit selects the one of the shift amounts for the respective pixel in dependence upon which of the shift amounts minimizes the sum of the calculated difference values between the respective pixel and its surrounding pixels. For each pixel, the selected shift amount may provide the initial shift amount for that pixel.

Note 2:
The correcting unit may be further configured to
generate, as the result of estimating the local amplitude of ringing artifacts, a ringing map indicating the local amplitude of ringing artifacts with respect to each of the pixels included in the magnetic resonance image, and
perform the ringing correction on the magnetic resonance image, while determining the shift amount of each of the pixels, sequentially in descending order starting with the pixels having a higher local amplitude on the ringing map.

Note 3:
The correcting unit may be further configured to perform an initial ringing correction that does not require a ringing map, and to generate a ringing map on the basis of a difference image between an image before the initial ringing correction and an image after the initial ringing correction.

Note 4:
The correcting unit may be further configured to
set a first threshold value related to the local amplitudes of ringing artifacts,
determine, with respect to each of a first set of the pixels of which the local amplitude is equal to or higher than the first threshold value, the shift amount so as to be close to the shift amounts of adjacently positioned pixels, and
determine, with respect to each of a second set of the pixels of which the local amplitude is lower than the first threshold value, the shift amount so as to be close to the shift amounts of adjacently positioned pixels and subsequently adjust the determined shift amounts for the second set of the pixels so that the shift amounts gradually diminish, sequentially in descending order starting with the pixels of the second set of the pixels having a higher local amplitude. The determining the shift amount so as to be close to the shift amount of the adjacently-positioned pixels comprises setting the shift amount to be closer to the initial shift amounts determined for the adjacently-positioned pixels.

Note 5:
The correcting unit may be further configured to
set a second threshold value smaller than the first threshold value, and
set the shift amount to 0 for each of the pixels of which the local amplitude of ringing artifacts is lower than the second threshold value.

Note 6:
The correcting unit may be further configured to set threshold values on the basis of the range of amplitudes of ringing artifacts across the magnetic resonance image, in combination with the number of pixels included in the magnetic resonance image. The correcting unit may be further configured to compute the residual range of amplitudes of ringing artifacts after excluding trivially low amplitudes, or extremely high amplitudes, or both, as the range of amplitudes of ringing artifacts to consider when setting the threshold values.

Note 7:
The correcting unit may be further configured to set a reference amplitude value on the basis of the range of amplitudes of ringing artifacts across the magnetic resonance image, in combination with the number of pixels included in the magnetic resonance image. After that, the correcting unit sets the threshold values by multiplying the reference amplitude value by predetermined constant parameters, one for each threshold.

The correcting unit may be further configured to set the first threshold value by multiplying the reference amplitude value by a predetermined constant parameter, and to set the second threshold value by multiplying the reference amplitude value by a another predetermined constant parameter.

Note 8:
The correcting unit may be further configured to iteratively improve the accuracy of the estimated local amplitudes and the quality of the ringing correction by re-estimating the local amplitudes of ringing artifacts and performing a ringing correction twice or multiple times.

Note 9:
An image processing method, comprising:
an acquiring step of acquiring a magnetic resonance image; and
a correcting step of determining, with respect to each of pixels included in the magnetic resonance image, a shift amount from the position of the pixel to a position where ringing artifacts will be reduced and further performing a ringing correction to correct the ringing artifacts occurring in the magnetic resonance image on the basis of the determined shift amounts, wherein
the correcting step includes
estimating, with respect to each of the pixels included in the magnetic resonance image, a local amplitude of ringing artifacts, and
performing the ringing correction on the magnetic resonance image, while determining the shift amount of each of the pixels so as to be approximately continuous with the shift amounts of adjacently positioned pixels, sequentially in descending order starting with pixels having a higher local amplitude on the basis of the result of estimating the local amplitudes of ringing artifacts.

Note 10:
A magnetic resonance imaging apparatus, comprising:
a generating unit configured to generate a magnetic resonance image; and
a correcting unit configured to determine, with respect to each of pixels included in the magnetic resonance image, a shift amount from the position of the pixel to a position where ringing artifacts will be reduced and configured to perform a ringing correction to correct the ringing artifacts occurring in the magnetic resonance image on the basis of the determined shift amounts, wherein
the correcting unit is configured to
estimate, with respect to each of the pixels included in the magnetic resonance image, a local amplitude of ringing artifacts, and
perform the ringing correction on the magnetic resonance image, while determining the shift amount of each of the pixels so as to be approximately continuous with the shift amounts of adjacently positioned pixels, sequentially in descending order starting with pixels having a higher local amplitude on the basis of the result of estimating the local amplitudes of ringing artifacts.

What is claimed is:
1. An image processing apparatus, comprising:
processing circuitry configured to
acquire a magnetic resonance image; and
determine, with respect to each pixel of pixels included in the magnetic resonance image, a shift amount from a position of the pixel to a position where ringing artifacts will be reduced, and perform a ringing correction to correct the ringing artifacts occurring in the magnetic resonance image based on the determined shift amounts, wherein
the processing circuitry is further configured to
estimate, with respect to each pixel of the pixels included in the magnetic resonance image, a local amplitude of the ringing artifacts occurring in the magnetic resonance image, and
perform the ringing correction on the magnetic resonance image based on a result of estimating the local amplitudes of the ringing artifacts, while determining the shift amount of each pixel of the pixels included in the magnetic resonance image so as to be approximately continuous with the shift amounts of adjacently posi- tioned pixels, sequentially in descending order starting with pixels having a higher local amplitude of the ringing artifacts.

2. The image processing apparatus according to claim 1, wherein the processing circuitry is further configured to:
generate, as the result of estimating the local amplitudes of ringing artifacts, a ringing map indicating the local amplitude of ringing artifacts with respect to each of the pixels included in the magnetic resonance image, and
perform the ringing correction on the magnetic resonance image based on the ringing map, while determining the shift amount of each of the pixels included in the magnetic resonance image, sequentially in descending order starting with the pixels having a higher local amplitude of the ringing artifacts.

3. The image processing apparatus according to claim 2, wherein the processing circuitry is further configured to perform the ringing correction on the magnetic resonance image and generate a ringing map based on a difference image between an image before an initial ringing correction and an image after the initial ringing correction.

4. The image processing apparatus according to claim 1, wherein the processing circuitry is further configured to;
set a first threshold value related to the local amplitude of ringing artifacts,
determine, with respect to each of a first set of the pixels of which the local amplitude is equal to or higher than the first threshold value, the shift amount so as to be close to the shift amounts of the adjacently positioned pixels, and
determine, with respect to each of a second set of the pixels of which the local amplitude is lower than the first threshold value, the shift amount so as to be close to the shift amounts of the adjacently positioned pixels, and subsequently adjust the determined shift amounts for the second set of the pixels so that the shift amounts gradually diminish, sequentially in descending order starting with pixels of the second set of the pixels having a higher local amplitude.

5. The image processing apparatus according to claim 4, wherein the processing circuitry is further configured to;
set a second threshold value smaller than the first threshold value, and
set the shift amount to 0 for each of the pixels of which the local amplitude of ringing artifacts is lower than the second threshold value.

6. The image processing apparatus according to claim 4, wherein the processing circuitry is further configured to:
set threshold values based on a range of amplitudes of ringing artifacts across the magnetic resonance image, in combination with a number of pixels included in the magnetic resonance image, and
compute a residual range of amplitudes of ringing artifacts after excluding trivially low amplitudes, or extremely high amplitudes, or both, as the range of amplitudes of ringing artifacts to consider when setting the threshold values.

7. The image processing apparatus according to claim 6, wherein the processing circuitry is further configured to:
set a reference amplitude value based on the range of amplitudes of ringing artifacts across the magnetic resonance image, in combination with the number of pixels included in the magnetic resonance image; and
set the threshold values by multiplying the reference amplitude value by predetermined constant parameters, one for each threshold.

8. The image processing apparatus according to claim 1, wherein the processing circuitry is further configured to iteratively improve an accuracy of the estimated local amplitudes and a quality of the ringing correction by re-estimating the local amplitudes of ringing artifacts and performing a ringing correction twice or multiple times.

9. An image processing method, comprising:
acquiring a magnetic resonance image; and
determining, with respect to each pixel of pixels included in the magnetic resonance image, a shift amount from a position of the pixel to a position where ringing artifacts will be reduced and further performing a ringing correction to correct the ringing artifacts occurring in the magnetic resonance image based on the determined shift amounts, wherein
the performing of the ringing correction includes
estimating, with respect to each pixel of the pixels included in the magnetic resonance image, a local amplitude of the ringing artifacts occurring in the magnetic resonance image, and
performing the ringing correction on the magnetic resonance image based on a result of estimating the local amplitudes of the ringing artifacts, while determining the shift amount of each pixel of the pixels included in the magnetic resonance image so as to be approximately continuous with the shift amounts of adjacently positioned pixels, sequentially in descending order starting with pixels having a higher local amplitude of the ringing artifacts.

10. A magnetic resonance imaging apparatus, comprising:
processing circuitry configured to
generate a magnetic resonance image; and
determine, with respect to each pixel of pixels included in the magnetic resonance image, a shift amount from a position of the pixel to a position where ringing artifacts will be reduced and perform a ringing correction to correct the ringing artifacts occurring in the magnetic resonance image based on the determined shift amounts, wherein
the processing circuitry is further configured to
estimate, with respect to each of the pixels included in the magnetic resonance image, a local amplitude of the ringing artifacts occurring in the magnetic resonance image, and
perform the ringing correction on the magnetic resonance image based on a result of estimating the local amplitudes of the ringing artifacts, while determining the shift amount of each pixel of the pixels included in the magnetic resonance image so as to be approximately continuous with the shift amounts of adjacently positioned pixels, sequentially in descending order starting with pixels having a higher local amplitude of the ringing artifacts.

* * * * *